United States Patent
Kolesnikowicz et al.

(10) Patent No.: US 12,407,778 B1
(45) Date of Patent: Sep. 2, 2025

(54) SYSTEMS AND METHODS FOR ANALYZING AND REDIRECTING ACTIVE CALLS

(71) Applicant: Retreaver, Inc., Las Vegas, NV (US)

(72) Inventors: Jason Kolesnikowicz, Toronto (CA); Stan Pavlovsky, Toronto (CA)

(73) Assignee: Retreaver, Inc., Las Vegas, NV (US)

( * ) Notice: Subject to any disclaimer, the term of this patent is extended or adjusted under 35 U.S.C. 154(b) by 0 days.

(21) Appl. No.: 18/956,320

(22) Filed: Nov. 22, 2024

Related U.S. Application Data

(60) Provisional application No. 63/684,058, filed on Aug. 16, 2024.

(51) Int. Cl.
  *H04M 3/00* (2024.01)
  *H04M 3/51* (2006.01)
  *H04M 3/523* (2006.01)
  *H04M 3/58* (2006.01)

(52) U.S. Cl.
  CPC ....... *H04M 3/5232* (2013.01); *H04M 3/5175* (2013.01); *H04M 3/5231* (2013.01); *H04M 3/58* (2013.01); *H04M 2201/42* (2013.01); *H04M 2203/405* (2013.01)

(58) Field of Classification Search
  CPC ............. H04M 3/5232; H04M 3/5175; H04M 3/5231
  USPC .............. 379/207.01–207.6, 201.01
  See application file for complete search history.

(56) References Cited

U.S. PATENT DOCUMENTS

| | | | |
|---|---|---|---|
| 5,384,831 A | 1/1995 | Creswell | |
| 5,537,470 A * | 7/1996 | Lee | H04M 3/51 379/207.15 |
| 7,773,740 B2 * | 8/2010 | Beckstrom | H04M 3/5232 370/352 |
| 8,976,951 B1 | 3/2015 | Trandal | |
| 2006/0142012 A1 | 6/2006 | Kirchhoff | |
| 2010/0303226 A1 * | 12/2010 | Kradjel | H04M 3/5232 379/266.01 |
| 2013/0223617 A1 * | 8/2013 | Steiner | G06Q 10/06311 379/265.13 |

(Continued)

OTHER PUBLICATIONS

Set Up Revenue Recovery with RTB Pass Through (https://support.ringba.com/hc/en-us/articles/25708984899223-Set-up-Revenue-Recovery-with-RTB-Pass-Through) accessed Apr. 28, 2025.

(Continued)

*Primary Examiner* — William J Deane, Jr.

(74) *Attorney, Agent, or Firm* — TROUTMAN PEPPER LOCKE LLP; John A. Morrissett; Aaron E. Johnston

(57) ABSTRACT

Disclosed embodiments may include systems and methods for analyzing and redirecting active calls. The disclosed embodiments may include receiving a first call from a first incoming caller, receiving user data from one or more users for a first connection to the first call, selecting a first user from the one or more users based on the user data, connecting the first user to the first call, and determining whether the first user disconnected from the first call within a first predetermined time period. In response to determining the first user disconnected from the first call within the first predetermined time period, the disclosed embodiments may include selecting a second user from the one or more users based on the user data and connecting the second user to the first call.

20 Claims, 6 Drawing Sheets

(56) References Cited

U.S. PATENT DOCUMENTS

| | | | |
|---|---|---|---|
| 2015/0281435 A1* | 10/2015 | Charlson ............ | H04M 3/5158 |
| | | | 379/142.06 |
| 2016/0180381 A1* | 6/2016 | Kaiser ................ | G06Q 30/0255 |
| | | | 705/14.53 |
| 2017/0111503 A1* | 4/2017 | McGann ............ | H04M 3/5235 |

OTHER PUBLICATIONS

Pricing (https://www.ringba.com/pricing/) accessed Apr. 28, 2025.
Revenue Recovery (https://support.ringba.com/hc/en-us/articles/25286177294615-Revenue-Recovery) accessed Apr. 28, 2025.
Revenue Recovery FAQ (https://support.ringba.com/hc/en-us/articles/25509076401943-Revenue-Recovery-FAQ) accessed Apr. 28, 2025.
Release Notes for April, Published Apr. 19, 2024 (https://support.ringba.com/hc/en-US/articles/25509076401943-Revenue-Recovery-FAQ) accessed Apr. 28, 2025.

\* cited by examiner

US 12,407,778 B1

SYSTEMS AND METHODS FOR ANALYZING AND REDIRECTING ACTIVE CALLS

CROSS-REFERENCE TO RELATED APPLICATION

This application claims the benefit of, and priority under 35 U.S.C. § 119(e) to, U.S. Provisional Patent Application No. 63/684,058, entitled "Systems and Methods for Analyzing and Redirecting Active Calls," filed Aug. 16, 2024, the contents of which are hereby incorporated by reference herein in their entirety as if fully set forth below.

FIELD

The disclosed technology relates to systems and methods for analyzing and redirecting active calls. Specifically, this disclosed technology relates to detecting that a first connection with a caller has ended within a predetermined amount of time and creating a second connection with the caller.

BACKGROUND

Companies often track the success of ad campaigns based on the phone number called by a potential customer in connection with purchasing a product or service over the phone. Because phone calls can lead to a higher conversion rate (and more sales) than other types of marketing, phone leads are valuable.

In some cases, call marketing companies (e.g., marketers) may generate leads (e.g., active callers) from ad campaigns and sell those leads in real-time (e.g., by transferring the call) to companies selling products and services in which the callers are interested. However, sometimes the potential customer who called is not interested in the product or service that a particular company is selling. This may result in the company ending the call with the potential customer and, in turn, limiting the value of the lead by requiring the potential customer to call again to attempt to purchase products or services.

Accordingly, there is a need for improved systems and methods for analyzing and redirecting active calls. Embodiments of the present disclosure are directed to this and other considerations.

SUMMARY

Disclosed embodiments may include a system for analyzing and redirecting active calls (e.g., between a potential customer "lead" and companies selling products or services). The system may include one or more processors, and memory in communication with the one or more processors and storing instructions that, when executed by the one or more processors, are configured to cause the system to analyze and redirect active calls. The system may receive a first call from a first incoming caller (e.g., a potential customer). The system may also receive user data from one or more users (e.g., companies selling products or services) for a first connection to the first call. The system may further select a first user (e.g., first company) from the one or more users based on the user data. Additionally, the system may connect the first user to the first call with the first incoming caller. Furthermore, the system may determine whether the first user disconnected from the first call within a first predetermined time period (e.g., 30 seconds into connecting the potential customer with the first company), and select a second user (e.g., second company) from the one or more users based on the user data and connect the second user to the first call. In this manner, the system may extend the value of the lead by connecting the potential customer with another company over the same call when the first company attempts to end the call with the potential customer.

Disclosed embodiments may include a method for analyzing and redirecting active calls. The method may include receiving, from a third-party system, caller data (e.g., a contact method) associated with a first caller (e.g., a potential customer). The method may also include receiving user data from one or more users (e.g., companies selling products or services) for a first connection to the first caller via the contact method. Additionally, the method may include selecting a first user (e.g., a first company) from the one or more users based on the user data. The method may also include transmitting at least a first portion of the user data associated with the first user to the third-party system. In response to the third-party system accepting the first user based on the first portion of the user data, the method may include connecting the first user to the first caller using the first connection. Furthermore, the method may include determining whether the first user terminated the first connection with the first caller within a first predetermined time period. In response to determining the first user terminated the first connection with the first caller within the first predetermined time period, the method may include selecting a second user (e.g., a second company) of the one or more users based on the user data, transmitting at least a second portion of the user data associated with the second user to the third-party system, and, in response to the third-party system accepting the second user based on the second portion of the user data, connecting the second user to the first caller using a second connection. In this manner, the system may extend the value of a lead transferred from a third-party system by connecting the potential customer with another company over the same call when the first company attempts to end the call with the potential customer.

Disclosed embodiments may include a method for analyzing and redirecting active calls. The method may include establishing a first call with a first caller (e.g., a potential customer). The method may further include receiving user data from one or more users (e.g., companies selling products or services) for a first connection to the first call. The method may also include selecting a first user (e.g., a first company) from the one or more users based on the user data. Additionally, the method may include connecting the first user to the first call. Furthermore, the method may include determining, using one or more signals (e.g., via an application programming interface), that the first user disconnected from the first call within a first predetermined time period. In response to the first user disconnecting from the first call within the first predetermined time period, the method may include selecting a second user (e.g., a second company) from the one or more users and connecting the second user to the first call.

Disclosed embodiments may include a system for analyzing and redirecting active calls (e.g., between a potential customer "lead" and companies selling different products or services). The system may include one or more processors, and memory in communication with the one or more processors and storing instructions that, when executed by the one or more processors, are configured to cause the system to analyze and redirect active calls. The system may receive a first call from a first incoming caller; receive an indication of redirection from the first incoming caller. The system may also receive first user data from one or more users for a first connection to the first call. Furthermore, the system may select a first user from the one or more users based on the first user data. The system may additionally connect the first user to the first call. The system may determine whether the first user disconnected from the first call within a first time period. In response to determining that the first user disconnected from the first call after an expiration of the first time period. The system may determine whether the indication of redirection allows one or more redirections. In response to determining that the indication allows for the one or more redirections, the system may receive response data from the first incoming caller indicating one or more interests. The system may select a second user of the one or more users based on the one or more interests. Furthermore, the system may connect the second user to the first call.

Disclosed embodiments may include a method for analyzing and redirecting active calls. The method may include receiving a first call from a first caller. The method may further include receiving an indication of redirection from the first incoming caller. The method may also include receiving first user data from one or more users of a first group for a first connection to the first call. The method may additionally include selecting a first user from the one or more users of the first group based on the user data; connecting the first user to the first call. The method may include determining whether the first user disconnected from the first call after an expiration of a first predetermined time period. The method may include determining whether the indication of redirection allows one or more redirections. In response to determining that the indication allows for the one or more redirections, the method may include selecting a second user from the one or more users of a second group based on the user data. Furthermore, the method may include connecting the second user to the first call.

Disclosed embodiments may include a system for analyzing and redirecting active calls (e.g., between a potential customer "lead" and companies selling different products or services). The system may include one or more processors, and memory in communication with the one or more processors and storing instructions that, when executed by the one or more processors, are configured to cause the system to analyze and redirect active calls. The system may receive a first call from a first incoming caller; receive an indication of redirection from the first incoming caller. The system may also receive first user data from one or more users of a first group for a first connection to the first call. The system may further select a first user from the one or more users of the first group based on the first user data. The system may connect the first user to the first call. Additionally, the system may determine whether the first user disconnected from the first call within a first predetermined time period. In response to determining that the first user disconnected from the first call after an expiration of the predetermined time period, the system may determine whether the indication of redirection allows for one or more redirections. In response to determining that the indication allows for the one or more redirections, the system may select a second user of the one or more users of a second group. Furthermore, the system may connect a second user to the first call.

Further implementations, features, and aspects of the disclosed technology, and the advantages offered thereby, are described in greater detail hereinafter, and can be understood with reference to the following detailed description, accompanying drawings, and claims.

BRIEF DESCRIPTION OF THE DRAWINGS

Reference will now be made to the accompanying drawings, which are not necessarily drawn to scale, and which illustrate various implementations, aspects, and principles of the disclosed technology. In the drawings.

DETAILED DESCRIPTION

Figure 1:
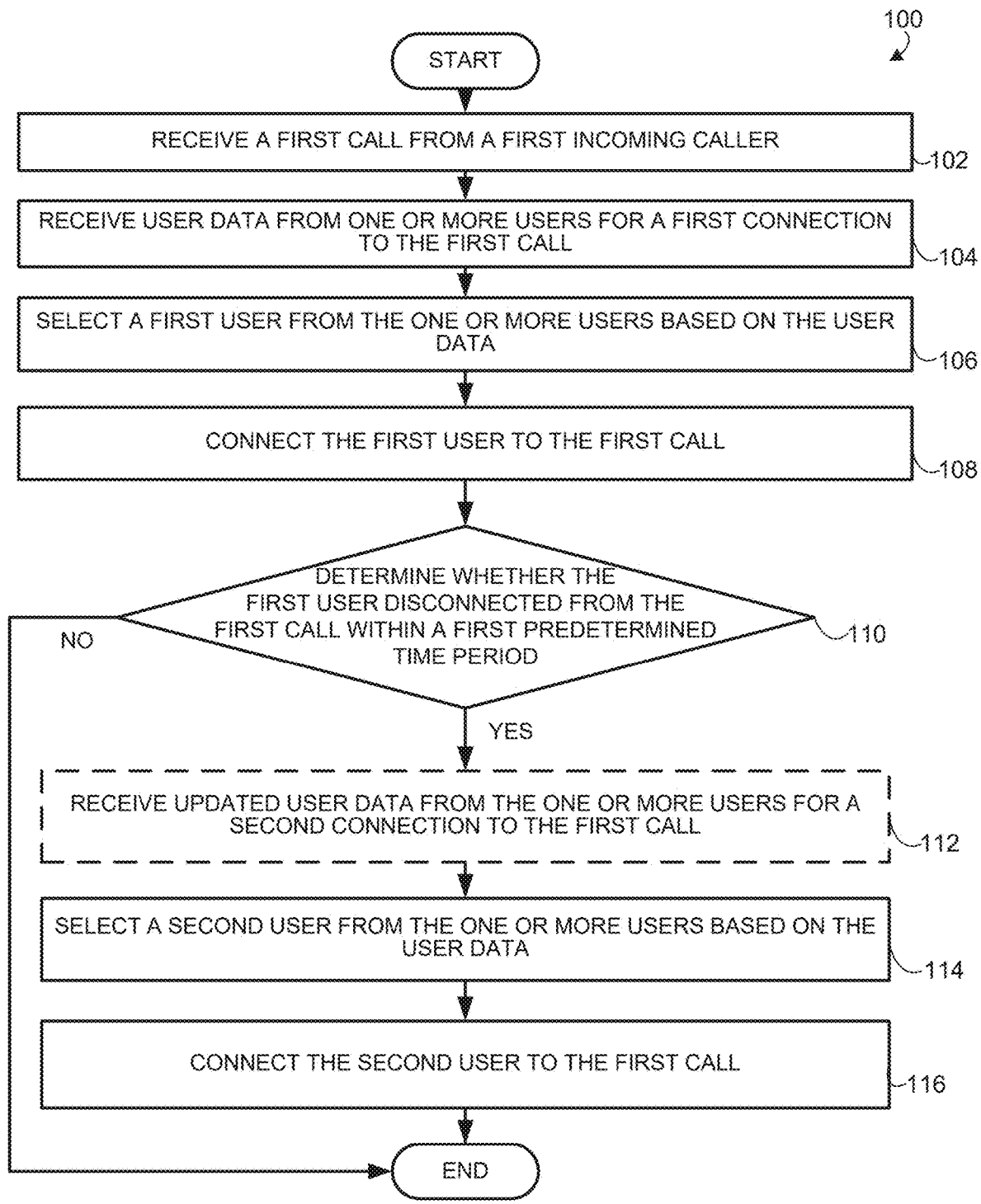
FIG. 1 is a flow diagram illustrating an exemplary method for analyzing and redirecting active calls in accordance with certain embodiments of the disclosed technology.

The present disclosure details systems and methods for recovering lost phone leads by analyzing a phone call between a caller (e.g., an incoming caller) and a user (e.g., a call purchaser, buyer, receiver, publisher, or outgoing call receiver), determining that the call receiver does not wish to continue the call, and rerouting the caller to a new call receiver. This may allow for leads (e.g., active callers) that otherwise previously would have been lost to be connected with a new call receiver that can provide a different product or service. The present disclosure provides a technical solution to a technical problem. Accordingly, one of the exemplary technical problems disclosed is that, in some embodiments, it is difficult to prevent the call from automatically ending when the call receiver does not wish to continue to the call (e.g., when the call receiver hangs up). Furthermore, a similar exemplary technical problem is maintaining the call with the caller while connecting a new call receiver. Accordingly, the present disclosure solves these technical problems by providing technical solutions and using the disclosed methods to recognize that the call receiver does not wish to continue the call, and to maintain the call with the caller while connecting the caller to the new call receiver. The disclosed solutions ultimately allow for the transfer of a caller from a first call receiver to multiple other call receivers so that the caller is connected with an appropriate call receiver in a minimal amount of time. This allows for dynamic pricing of call leads and the use of dynamic criteria for selecting new call users to interact with the caller to maximize conversion.

Furthermore, the disclosed systems and methods may include new metrics and systems for reporting data. Previous systems were only able to connect a caller with one call receiver. Therefore, metrics and statistics regarding callers (e.g., conversion rates) were historically generated based on a fixed ratio (e.g., one incoming call from a caller to one outgoing call to a call receiver). As a result of the disclosed technology, the historical metrics and statistics are no longer accurate as one incoming call from a caller may potentially lead to multiple outgoing calls to call receivers (e.g., one incoming call from a caller leads to two outgoing calls to call purchasers). Accordingly, the present disclosure includes new systems and methods for accurately reporting call metrics based on new call connections. This allows for dynamic call tracking and statistics generation.

In some instances, this may utilize graphical user interfaces, which are necessarily rooted in computers and technology. Graphical user interfaces are a computer technology that allows for user interaction with computers through touch, pointing devices, or other means. This, in some examples, may involve using user input data to dynamically change the graphical user interface to change various aspects of the disclosed system, such as features and options regarding caller redirection and statistics. Using a graphical user interface in this way may allow the system to enable call redirection to connect callers with appropriate call receivers. Overall, the systems and methods disclosed have significant practical applications because of the noteworthy improvements through the redirection of calls, which are important to solving present problems with this technology.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods.

Reference will now be made in detail to example embodiments of the disclosed technology that are illustrated in the accompanying drawings and disclosed herein. Wherever convenient, the same reference numbers will be used throughout the drawings to refer to the same or like parts.

FIG. 1 is a flow diagram illustrating an exemplary method 100 for analyzing and redirecting active calls, in accordance with certain embodiments of the disclosed technology. The steps of method 100 may be performed by one or more components of the system 400 (e.g., call routing system 320 or web server 410 of call system 408 or user device 402), as described in more detail with respect to FIGS. 3 and 4. The system 400, call system 408, or call routing system 320 may include an inbound or outbound call tracking system.

In block 102, the call routing system 320 may receive a first call from a first caller. The first caller may be a making an inquiry about a product or service they saw in an advertisement (e.g., an online advertisement). The first caller may make the call from a landline, a mobile phone, or smartphone. The call may be received via a public switched telephone network (PSTN), which may be received at a call server (e.g., call sever 430 in FIG. 4) or a similar server of a third-party system (e.g., third-party system 460). The call may be received via a voice over IP (VoIP) system or other examples of digital telephony that may be processed by a call server (e.g., a call center server), third-party system, or other parts of call system 408. In some embodiments, phone call reception and routing may be handled by an external server or service, which may be directed through instructions provided by system 400, call system 408, and/or call routing system 320. The external service may be an external communications service (e.g., Twilio) that allows for communications via web service application programming interfaces (API). System 400, call system 408, call routing system 320 may receive and transmit messages via the APIs to the external communications service to control the routing of calls and receive information regarding calls (e.g., incoming calls from callers). Call routing system 320 may receive the call or an indication of the call and information about the call from the other constituent parts of the call system (e.g., call system 408), call server, (e.g., call server 430), a third-party system (e.g., third-party system 460), or an external server or service. At the outset of a first call, system 400, call system 408, and/or call routing system 320 may be connected to the first caller using a connection. A tracking number may be assigned to the first call by the call routing system 320. The tracking number may be used to monitor the call in real-time and/or generate statistics regarding the call. In some embodiments, the first call may be assigned to or associated with a token (e.g., call token, call session token). The token may include a tracking number. The token may be an anonymized identifier (e.g., an anonymized ID associated with a caller and/or user). In some embodiments, the token may be used throughout method 100 to track the first call, connections to the first call, and disconnections from the first call. The token may be unique to a call, a caller, a phone number, a user, an account, and to a call record. The token may be saved to a database with metrics of the call and record various aspects of the call (e.g., call audio). The token may also be associated with a web advertisement or a web link, and may associate the first call with a web link or web advertisement. The token may be used to track information regarding caller and/or user experience (e.g., over single and repeat calls). In some embodiments, call routing system 320 may also be capable of placing outgoing calls to potential leads in addition to receiving calls from leads.

The information about the call (e.g., the first call) may include, for example, the phone number that the first caller dialed and caller ID statistics (e.g., the number being dialed from, the name, address, area code or zip code of the caller). The information about the call may include information about the caller such as demographics, hobbies, homeowner status, consumer profile information, and estimated income. The information about the call may include data received or retrieved via internet browsing history or cookies. Other details may also be received or retrieved by call routing system 320 from other parts of call system 408, database 416, or third-party system 460, such as: campaign information or a description of connection of the phone number to an associated campaign. Call routing system 320 may retrieve information about the user from databases that track a callers internet history to provide insight to what the products or services the caller is looking for. Call routing system 320 may query a database (e.g., a $3^{rd}$ party database) using caller ID information to provide additional information about the caller. Using the information received, call routing system 320 may generate description, images, or statistics regarding the marketing campaign or marketing associated with that phone number, or a predicted purpose of the call. For example, the call routing system 320 may estimate what the caller may be calling about based on the number called and what the marketing campaign is directed towards (e.g., if the caller dials a number on an ad directed towards better car insurance, call routing system 320 may estimate that the caller is interested in purchasing a new car insurance policy). Call routing system 320 may retain information about the call as call data in a database (e.g., database 360, database 416). The call data in the database may be updated as more information regarding the call is generated or more information is learned about the caller as method 100 proceeds through blocks 102 to 116. The call data may be associated in the database with the associated call token. Attributes regarding the call may be associated with tabular values associated with the token.

Based on the information received and/or retrieved, call routing system 320 may determine which users (e.g., internal users or external users) may be interested in receiving the first call from the first caller. For example, if call routing system 320 is being used by a call marketer, the call routing system 320 may be able determine which users (e.g., buyers or bidders, such as user 450*a*, 450*b*, or 450*c* in FIG. 4) would be interested in purchasing or handling the lead (e.g., the active first call) from the first caller in real-time. Call routing system 320 may have assorted groups of users (e.g., a first group selling car insurance, a second group selling life insurance, and third group selling health insurance). Call routing system 320 may associate the first call with a particular group of users. In the example above, with a caller interested in car insurance, call routing system 320 may determine that a first group of users selling car insurance is most appropriate to handle the first caller's inquiry since the first caller called a number on an ad about car insurance.

Call routing system 320 may transmit one or more messages to users regarding the first call from the first caller. Call routing system 320 may transmit the messages to all users or to only a select group of users as described above. The message may include data about the first call such as the estimate of what the user is calling about, the approximate geographical location of the user (e.g., based on the area code or the zip code), and/or a campaign the call is related to. Call routing system 320 may transmit or send an inquiry regarding whether users are able to take a call from the first caller in real-time. Call routing system 320 may solicit or request a bid or offer from the user. The bid or offer may be for a connection to the first caller or more than one connection to one or more callers on one or more calls.

In block 104, the call routing system 320 may receive user data from one or more users for a first connection to the first call. One or more users may provide user data to the call routing system 320. The user data may comprise a bid or offer for the connection to the first caller (e.g., $2.00). The bid or offer may be based on data about the first call supplied to the one or more users. In some embodiments, the user data may indicate the availability of the user (e.g., a signal indicating that the user is available to take a call with the caller now or a signal indicating that the user is not currently available, but can take a call with the caller in an estimated 2 minutes). Call routing system 320 may receive user data from a large number of different users, which may be internal or external to call system 408. The user data (e.g., bids from users) may be saved or updated in association with the call token.

In block 106, the call routing system 320 may select a first user from the one or more user based on the user data. Call routing system 320 may use several different methods for selecting a first user from the one or more users. First, call routing system 320 may select the user that presented the highest bid (e.g., offered the greatest amount). For example, if user 450*a* offered $3.00 for a call, user 450*b* offered $8.00 for a call, and user 450*c* offered $2.00 for a call, call routing system 320 may select user 450*b* as the first user because the bid from user 450*b* is greater than the bids from users 450*a* and 450*c*. Second, call routing system 320 may select the first user based on an order in a queue. For example, after call routing system 320 may use a hierarchy to determine a queue of users. The queue may be based on availability data received from the users, the response speed of the user, characteristics related to the user (e.g., if the user is a member of a specific plan for receiving callers), working hours of the user, historical data related to the user, or other data. Third, call routing system 320 may select a first user based on rules-based decisioning. Call routing system 320 may have a rules system that may influence which user is chosen as the first user. The rules system may be set by specific organizations or users, and may be modified by a graphical user interface presented on a device (e.g., device 402). The rules system may include priorities that identify certain users to be chosen over other users, routing to certain users based on the location of a caller (e.g., a state or city), routing based on tags, routing based on a comparison of data (e.g., if an assigned value of one user is greater than or less than the assigned value of a second user). In some embodiments, call routing system may select the first user based on availability. In some embodiments, the selection of a user may also be based on the call data. The selection of a first user may be saved or updated in association with the call token.

In block 108, the call routing system 320 may connect the first user to the first call. In response to call routing system 320 selecting a user as the first user, call routing system 320 may connect the first user to the first call so that the first user may interact with the first caller. In some embodiments, this may be completed by sending instructions to the call server (e.g., call server 430), third-party system 460, or an external service to connect the first user to the first call. In some embodiments, the call may be a conference call or a three-way call between the caller, the first user, and call routing system 320 (or call system 408). Call routing system 320 may send instructions to the call server to add the first user to the existing call between the caller and the call routing system 320 to form a conference call or three-way call. By using a conference call or three-way call structure, it may allow call system 408 and/or call routing system 320 to retain control and keep inbound calls open and connected (e.g., from inbound callers), while adding in multiple subsequent users sequentially (e.g., a first user, then a second user) on multiple outbound legs. In some embodiments, the call routing system 320 may utilize a two-way call in between the caller and the user, and the call routing system 320 may be able to receive signals or information regarding the status of the call between the caller and the user and transmit signals or commands to route or change the call. In some embodiments, the call routing system 320 may organize the call as having a first inbound leg from a caller that may be connected to one or more outbound legs with users. The call routing system 320 may be capable of swapping or switching the outbound legs. In some embodiments, a token may be used to track the status of connections to, and disconnections from, the first call. The token may include a state change variable indicating whether a call has been redirected to a new user. The token may include a counter variable indicating a number of times a call has been redirected to a new user. The variables associated with the tokens may be used by the system to generate statistics.

In block 110, the call routing system 320 may determine whether the first user disconnected from the first call with the first caller. As the call is ongoing, the first user may decide that they no longer wish to continue the first call (e.g., if the first caller is looking for a service the first user does not have). Therefore, the first user may hang up the first call relatively quickly after being added to the call with the first caller in block 108. Call routing system 320 may determine if the first user has disconnected from the call (e.g., hung up or left the conversation). Call routing system 320 may determine if the first user disconnected from the call within a first time period from being connected to the call. The first time period may be fixed (e.g., static) or dynamic, and may be predetermined. For example, the first time period may vary based on a type of caller (e.g., if they are calling from a home line or business line), the number called, the time of day, the ad responded to, the product and/or service the caller is looking to purchase, and/or user settings (e.g., the settings of the first user connected). If call routing system 320 determines that the first user disconnected in less than or equal to the duration of the time period, then the call routing system 320 may continue the call without the first user. If call routing system 320 determines that the first user disconnected after the time period expires (e.g., an amount of time greater than the time period), then the call routing system 320 may allow the call to end. For example, the first time period may be a predetermined time period of 30 seconds. If call routing system 320 determines that the first user has disconnected after 10 seconds, call routing system 320 may continue the call. If call routing system determines that the first user disconnected after 10 minutes, call routing system 320 may allow the call to end (e.g., as the call had sufficient time for the caller to make an inquiry).

In some embodiments, the determination of block 110 may be related to other features besides, or in addition to, a time period of the call. For example, the determination may be statically fixed or changed by a user setting (e.g., a user may be capable of setting or changing a time period that results in the redirection of the call, through, for example a graphical user interface presented on a user device). The determination may be dynamic and determined by past data of the user or related users. For example, the time period may be changed based on user performance, if there is another user available, or the time period may be related to a cost related with the lead. The determination may be influenced by statistics generated from other calls tracked by call tokens (e.g., if the call token generates statistics indicating that calls typically take less than 90 seconds to convert, then the predetermined time period may be set for less than 60 seconds by call routing system 320). A feedback loop may be used to constantly refine the time period using the statistics generated. If call routing system 320 determines the first user disconnected from the first call within the time period, then the method may continue to follow blocks 112 through 116. If call routing system 320 determines the first user disconnected from the first call outside the time period, then the method may end.

Call routing system 320 may use a variety of methods for making the determination in block 110. Call routing system 320 may use voice silence detection to determine whether the first user disconnected from the first call. For example, the call routing system 320 may, as the third-party on the phone call, receive audio data from the first caller and the first user. If the audio data indicates silence (e.g., no conversation) between the first caller and the first user within the time period, then the call routing system 320 may determine that the first user has hung up or left the call. In some embodiments, call routing system 320 may utilize speech recognition to determine whether the first user disconnected from the first call. For example, the call routing system 320 may, as the third-party on the phone call, receive audio data from the first caller and the first user. Call routing system 320 may use speech recognition to recognize specific words indicating the end of a conversation (e.g., "bye"). If the audio data indicates the conversation has ended (via the specific words), then the call routing system 320 may determine that the first user has hung up or left the call. The speech recognition may utilize one or more machine learning models or neural networks trained to recognize the specific words indicating the end of a conversation. The speech recognition may utilize sentiment analysis to analyze the conversation between the caller and the first user. In some embodiments, call routing system 320 may detect a hang up signal to determine the end of a conversation. In embodiments, such as those utilizing an external communications service, or capable of interacting with a call server via an API, call routing system 320 may poll the service, via the API, to provide notifications regarding the first call. The notifications may provide information from the service about the call, such as if a first user is connected and/or how long the first user has been connected. Call routing system 320 may receive, from the service, via the API, one or more first notifications indicating that the first user (e.g., the user on the first outbound leg) has left the first call or is about to leave (e.g., that the conversation between the first user and the caller has ended) in real-time. After receiving the one or more first notifications (e.g., as the first user's outbound leg is closing), if the first user was connected to the call less than the time period, call routing system 320 may transmit one or more second notifications to the service, via the API, instructing the service to continue the first call in real-time. The one or more second notifications transmitted via the API may indicate to the service that the call routing system 320 is ringing another user to connect to the call. The one or more second notifications may be repeatedly transmitted to the service from call routing system 320 until instructions are transmitted by the call routing system 320 to connect a second user to the first call in block 116. The call status and notifications may be saved or updated in association with the call token.

In some embodiments, the call routing system 320 may maintain a call with all inbound call legs while the determination in block 110 is made (e.g., in the event the call routing system 320 is unable to quickly determine the amount of time the first user was on the first call, whether the first user is still connected to the first call, and while locating a second user to connect to the first call) by repeated transmitting the one or more second notifications indicating to the service indicating that the call routing system 320 is attempting to connect another user to the call. This may give call routing system 320 additional time to make the determination in block 110, or locate another user to connect to the call (as detailed in blocks 112, 114, and 116). If the call routing system 320 determines that no additional user should be connected to the call after transmitting the one or more second notifications, the call routing system 320 may allow the call to end by stopping transmission of the one or more second notifications to the service or by transmitting a third notification to the service, indicating that the call may be ended (e.g., that the inbound leg from the caller may be closed).

In optional block 112, the call routing system 320 may receive updated user data from the one or more users for a second connection to the first call. In response to the first user disconnecting from the first call within the time period, call routing system 320 may select a second user to connect to the first call. In advance of that, call routing system 320 may optionally receive updated user data from the one or more users. This block may include processes similar to the processes described with reference to block 104. Call routing system 320 may transmit updated data regarding the first call (e.g., any data or information regarding the caller generated from the conversation with the first user) and/or the original data regarding the first call to the one or more users. The updated data transmitted to the one or more users may include an indication of how many times the present call has been redirected to a new user, or information transcripted and extracted from the caller's conversation with the first user including, for example, an indication of what products or services the caller is looking for or may qualify for. Call routing system 320 may solicit bids from the one more users for a second connection to the first call (e.g., a second round of bidding, the first round of bidding having been performed in block 104). Call routing system 320 may solicit bids to the same group of users as previously (as described in block 104) or call routing system may solicit bids from a different group of users. The one or more users may transmit bids or information to call routing system 320 (e.g., a bid for the second connection). The bids or information transmitted by the one or more users to call routing system 320 may be the same or different from earlier bids and information received from the one or more users in block 104. In some embodiments, this block may be optional as call routing system 320 may select a second user based on the user data received with reference to block 104. The updated user data may be saved or updated in association with the call token.

In block 114, the call routing system 320 may select a second user from the one or more users based on the user data. This block may include processes similar to the processes described with reference to block 106. In some embodiments, call routing system 320 may select a second user based on the user data previously provided in block 104. For example, if call routing system 320 received three bids for the connection to the first call, and the first user selected in block 106 was the highest bidder, at block 114, call routing system may select the second highest bidder from the first round of bidding (e.g., from block 104) as the second user. Call routing system 320 may also select a second user based on updated user data (e.g., updated bids) received in optional block 112 (e.g., a new round of bidding). In some embodiments, the selection of a user may also be based on the call data. The call data may be added to or enhanced by data acquired during the portion of the call with the first user. For example, if the first user learns on the call that the user is looking for a certain type of car insurance (e.g., agreed-upon value classic car insurance), that information may be saved to the database (e.g., the first user may enter information about the call and/or call routing system 320 may determine the information from the audio data) and associated with the token associated with the call and/or caller. The second user may be selected based on user data in conjunction with, or associated with the call data (e.g., call routing system 320 may choose a second user that is known to provide agreed-upon value classic car insurance if it is realized during the first call that the caller is looking for that particular product). In some embodiments, the call routing system 320 may extract information from the conversation with the first user (e.g., the call routing system may provide a machine transcription of the call with the first user to the one or more users). The extracted information may indicate how the call routing system 320 should route the call (or if a certain user should be selected over other users). For example, if from the conversation with the first user, it is revealed that the caller speaks Spanish, the call routing system 320 may select a second user that speaks Spanish to connect to the call. Extracted information from the first user's conversation may be used by the call routing system 320, and may be provided to one or more users. Extracted information may include language of the caller, the product or service the caller is looking for, the age of the caller, and other demographic information about the caller. The selection of a second user may be saved or updated in association with the call token.

In block 116, the call routing system 320 may connect the second user to the first call. In response to call routing system 320 selecting a user as the second user, call routing system 320 may connect the second user to the first call so that the second user may interact with the first caller. In some embodiments, this may be completed by sending instructions to the call server (e.g., call server 430), third-party system 460, or an external service to connect the second user to the first call. In some embodiments, the call may be a conference or three-way call between the caller, the second user, and call routing system 320 (or call system 408), and the instructions sent to the call server may be to add the second user to the existing call between the caller and the call routing system 320 to form the conference call or three-way call. In block 116, the caller's inbound leg may be connected with a user's outbound leg. Thus, call routing system 320 may swap or switch the inbound leg from a caller from a first outbound leg with a first user to a new, second outbound leg with a second user. Block 116 may be similar to block 108 except the second user is connected rather than the first user. The connection of a second user to the call may be saved or updated in association with the call token.

Figure 5:
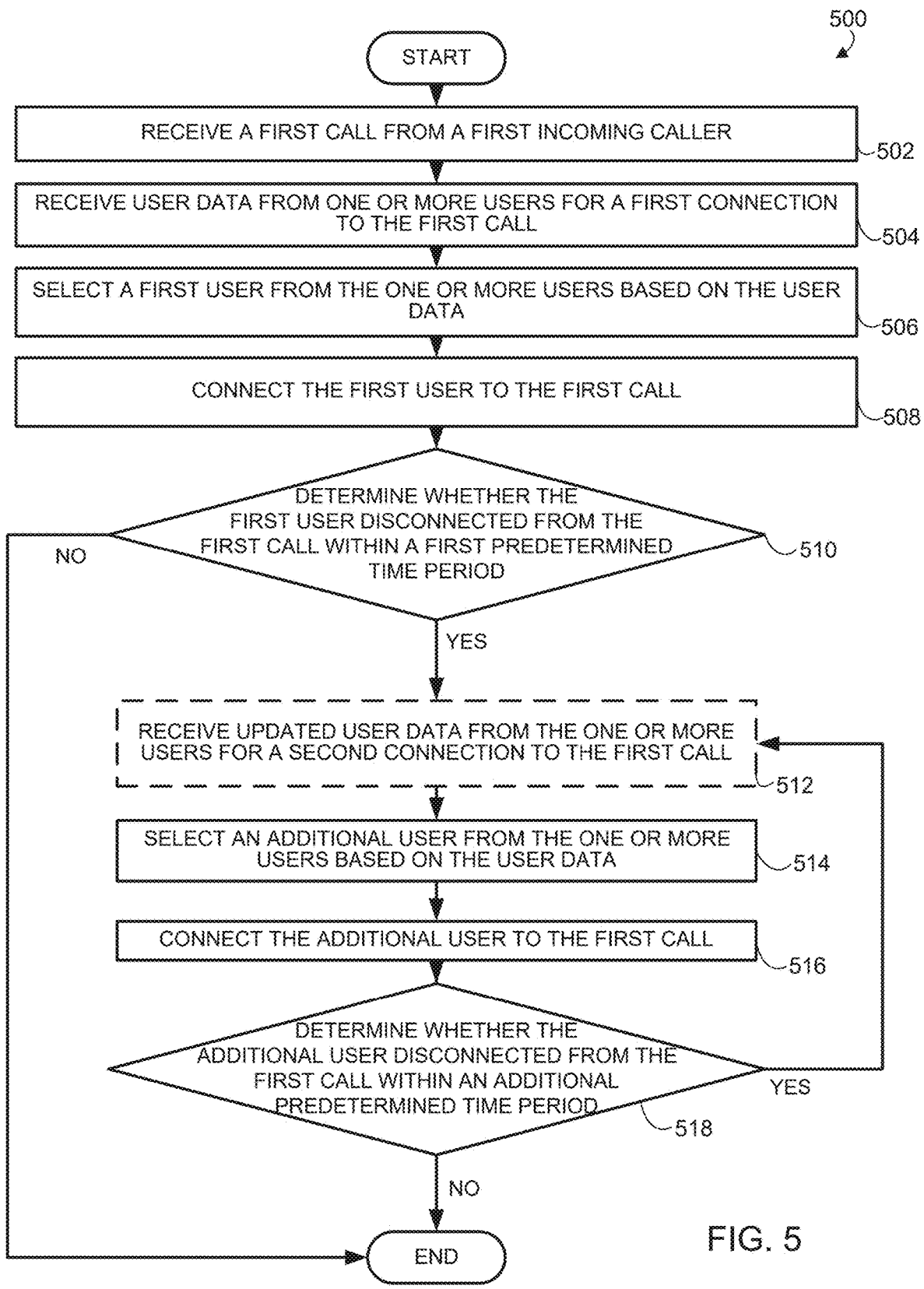
FIG. 5 is a flow diagram illustrating an exemplary method for analyzing and redirecting active calls in accordance with certain embodiments of the disclosed technology.

As the first call proceeds, blocks 110 through 116 may be repeated for successive users connected to the first call (e.g., as shown in FIG. 5). For example, if a second user hangs up within a second time period, the call routing system 320 may make another determination similar to that in block 110 regarding the second user. Call routing system 320 may receive updated user data from other users interested in a connection to the call (similar to block 112). Call routing system 320 may select a third user based on the user data (similar to block 114) and connect a third user to the first call (similar to block 116). If the third user hangs up within a time period, then call routing system may select a fourth user and connect a fourth user to the first call. Call routing system 320 may be setup by a user device 402 which may present a graphical user interface for controlling call routing system 320 and present options for manipulating call routing. For example, a user device 402 may be capable of setting the number of times call routing system 320 routes the call to a new user (e.g., that the system may route the call from a first user to a second user, but if the second user also disconnects within a time period, the call is not routed to a third user). The user device 402 may also be capable of changing the options or a setting regarding the disconnection time period. The disconnection time period may vary between users (e.g., the first user may have an associated disconnection time period of 30 seconds and the second user may associated disconnection time period of 40 seconds).

In order for calls to remain cohesive, and to prevent the caller from waiting excessive amounts of time, steps of method 100 may be completed in quick succession, such that the steps may be completed in real time as callers contact the system. For example, blocks 102-108 may be completed in less than 30 seconds, less than 10 seconds, less than 5 seconds, less than 3 seconds, less than 2 seconds, or less than 1 second. Blocks 110-116 may be completed in less than 30 seconds, less than 10 seconds, less than 5 seconds, less than 3 seconds, less than 2 seconds, less than 1 second, or less than 500 milliseconds. In some embodiments, method 10 (blocks 102-116) may be completed automatically as calls are received (e.g., the call routing system 320 may automatically interact with the systems of the users 450a, 450b, 450c and automatically direct and reroute calls). Call routing system 320 may be capable of monitoring and re-routing numerous different calls from numerous callers to different users simultaneously.

In some embodiments, after the disconnection from the first user and before the connection to the second user, call routing system 320 may interact with the caller to increase the cohesiveness of the call. This may be completed using an interactive voice response (IVR) system. The IVR system may include an AI (artificial intelligence) agent. For example, call routing system 320 may play an interactive message to a caller describing that they are being transferred to another provider who may better serve their needs (e.g., "we're sorry that you were unable to find the services you needed with the [first user], we are transferring you to a new provider to better help you find the service you need."). The caller may be able to interact with the automated system during the waiting period and may be able to answer questions that may supply additional information about the caller to users. The IVR system may utilize machine learning models and/or neural networks. In some embodiments, the IVR system may be used only after a certain number of redirections (e.g., after 3 redirections, the IVR system is used to ask information about why the caller is having difficulty, such as "what is the reason you were unable to make a purchase"). In some embodiments, the IVR system may ask the user at the end of a call if they are interested in other offers, products, or services. The IVR system may use information extracted from conversations with one or more users to present the caller with offers, products, or services they may be interested in.

Call routing system 320 may calculate a number of statistics regarding the first call and other calls. Call routing system 320 may generate and transmit one or more graphical user interfaces to user device 402 and/or users (via associated user devices) 450a, 450b, 450c. Call routing system 320 may receive signals via the graphical user interfaces presented on user device 402 and/or the user devices associated with users 450a, 450b, 450c. The graphical user interfaces may dynamically change in response to the signals received. The signals received via the graphical user interfaces may cause the call routing system 320 to manipulate or change the options for future call routing.

In some embodiments, call routing system 320 may generate calculated statistics for each user, statistics associated with the first call and other calls, statistics including at least a ratio of inbound calls to outbound calls, a ratio of outbound calls to inbound calls, and/or statistics including earnings per call inbound and/or outbound. If a caller is connected to multiple users, the ratio of outbound calls to inbound calls may be greater than one (e.g., two outbound calls to one inbound call). In some embodiments, the ratio of inbound calls to outbound calls and/or other statistics regarding calls (e.g., average time per connection), may be generated by tracking the token associated with the call and/or receiving or retrieving data (or variables) associated with a token associated with the call. The call routing system 320 may generate a first graphical user interface showing the statistics. The call routing system 320 transmit the first graphical user interface to a first device of the first user and a second device of the second user. The call routing system 320 may receive, via the first graphical user interface, from the first device of the first user, an updated selection of a selectable option (e.g., a button or drop down menu) indicating a change of routing responsive to determining a future user has disconnected from a future call with a future caller within the first predetermined time period. As a result, the call routing system 320 may change the routing for future calls in real time based on the updated selection of the selectable option. Furthermore, the call routing system 320 may generate an updated graphical user interface showing the updated selection of the selectable option.

In any of the methods 100, 200, 500, or 600, the call routing system 320 may use a variety of different subsystems to control call routing. For example, and as discussed above, the call routing system 320 may provide a graphical user interface to the user to help control call routing. The graphical user interface may be displayed on a display or transmitted to a user device to be displayed on a display. The graphical user interface may refer to one or more graphical user interfaces that may dynamically update as inputs are received from a user device or input device. The graphical user interface may allow the user to select options regarding how the call should be routed (e.g., rules or methods the call routing system 320 should use to determine the first time period). In some embodiments, the graphical user interface may provide a number of control options to aid in call routing. These control options may include: (1) a user manual control option (e.g., where the user is able to directly indicate the time period); (2) a rule-based automatic control option (e.g., where the call routing system 320 uses a set of rules to automatically control the time period); and (3) a machine learning model automatic control option (e.g., where the call routing system 320 determines using one or more machine learning models how to automatically control the time period). The user may be able to select from one or more of these control options via the graphical user interface to change how the call routing system 320 operates (e.g., how the call routing system 320 routes the calls). The graphical user interface may also include a suggestion or recommendation feature, which may appear next to control option, which may provide recommendations to user regarding how to improve their call statistics based on reviewed data. The recommendations to the user may be generated by the machine learning model automatic control option or the rule-based automatic control option. The recommendations to the user may be shown on the graphical user interface when the user has selected a manual control option. The user may be able toggle between the options and recommendations on the graphical user interface.

As described above, with the user manual control option, the user may directly be able to set a time period that the system uses for redirection (e.g., if the call ends in less than 30 seconds, redirect the call to a new user). The user may be capable of setting other criteria for redirection (e.g., to a specific other user or other group of users) via the graphical user interface.

In some embodiments, the call routing system 320 may include a rule-based automatic control option. The rule-based automatic control option may optimize the call routing based on data received (e.g., data tracked via one or more tokens) regarding previous calls. The rule-based automatic control option may be configured by the user via the graphical user interface to route the call (e.g., set a time for redirection) based on earnings per call, a conversion percentage, a conversion dollar amount, a conversion timeframe. The rule-based automatic control option may use a set of linear equations and linear optimizations to determine the best time period for a redirection. The rule-based automatic control option may operate in real-time, and may be capable of changing the time period in real-time as more data is received regarding callers.

In some embodiments, the call routing system 320 may include a machine learning model automatic control option. The machine learning model automatic control option may be configured by the user via the graphical user interface. One or more machine learning models for the machine learning model automatic control option may be trained with data from pervious incoming calls. The training may be specific to specific users, groups of users, or users offering a specific product type. The machine learning model automatic control option may include one or more machine learning models, and the one or more machine learning models may utilize linear regression model, decision trees, neural networks and/or reinforcement learning. In some embodiments, the linear regression model may be used to predict an outcome based on the caller, and use the outcome to determine a timeframe or an offer the caller may be interested in based on data from previous callers. In some embodiments, neural networks may be used to recognize non-linear aspects regarding callers (e.g., an age of the caller, and the offer selected as related to a specific offer the caller may be interested in). Accordingly, utilizing prior call data from previous callers allows for the collection of hundreds to thousands of data points (e.g., duration of call, the time of day of the call). By utilizing an automatic control option (e.g., rule-based automatic control option or machine learning model automatic control option), call routing system 320 may have improved performance, may route callers for effectively (e.g., by setting more appropriate time periods for redirection), and may select better users to route callers to (e.g., route callers to agents that are more appropriate to the callers needs by better mapping callers to agent services). By utilizing automatic control options with many data points, changes to call routing may be made in real-time using the token data received from ongoing and previous calls, thereby allowing previous call data to automatic enhance the routing of future and ongoing calls. This allows for higher conversion rates and higher caller satisfaction.

Figure 2:
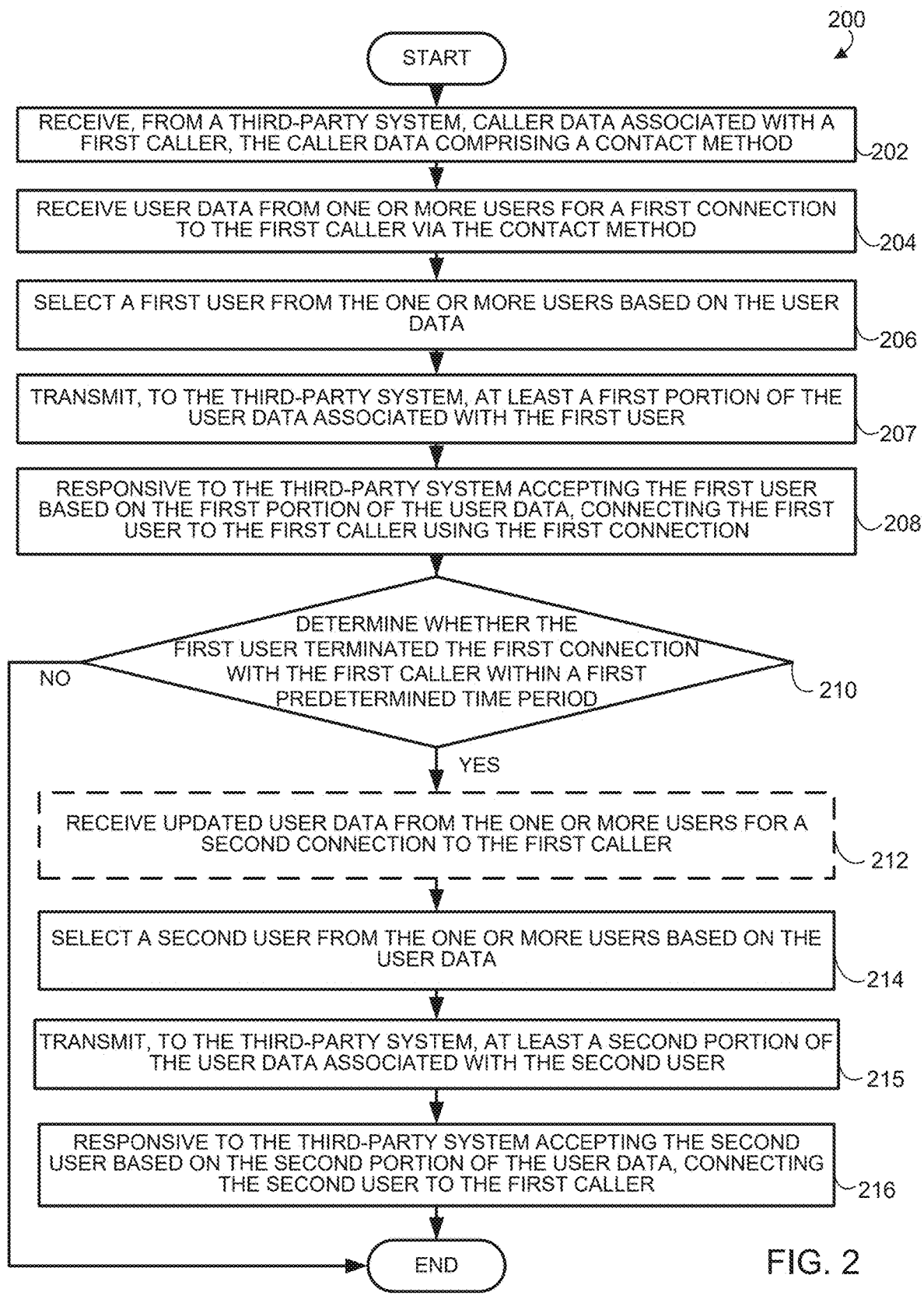
FIG. 2 is a flow diagram illustrating an exemplary method for analyzing and redirecting active calls in accordance with certain embodiments of the disclosed technology.

FIG. 2 is a flow diagram illustrating an exemplary method 200 for analyzing and redirecting active calls, in accordance with certain embodiments of the disclosed technology. The steps of method 200 may be performed by one or more components of the system 400 (e.g., call routing system 320 or web server 410 of call system 408 or user device 402), as described in more detail with respect to FIGS. 3 and 4. FIG. 2 may illustrate an embodiment for use with ping post software.

Method 200 of FIG. 2 is similar to method 100 of FIG. 1. The descriptions of blocks 202, 204, 206, 210, and 212 in method 200 are similar to the respective descriptions of blocks 102, 104, 106, 110, and 112 of method 100 and are not repeated herein for brevity. However, block 208 is different from block 108, and block 216 is different from block 116 and are described below. Method 200 may include additional blocks 207 and 215. FIG. 2 may describe an embodiment where a caller calls into a third-party system outside call system 408 (e.g., third-party system 460, which may be generally similar to call system 408). The third-party system 460 may transmit an indication comprising an offer to transfer the caller to call system 408 and/or call routing system 320. Call routing system 320 may select a first user and/or a second user as with method 100; however, the first user and/or second user may have to be approved or accepted by the third-party system 460 before the first user and/or second user may be connected to the call. Method 200 may also use tokens to track calls between third-party system, callers, and users.

In block 207, the call routing system 320 may transmit at least a first portion of the user data associated with the first user to a third-party system. After selecting the first user in block 206 (e.g., via highest bid, availability, etc.), the call routing system 320 may transmit a portion of the user data associated with the first user to the third-party system (e.g., third-party system 460) for approval. In some embodiments, this may include transmitting an indication of a bid amount (or a portion of a bid amount) to the third-party system. In some embodiments, this may involve transmitting and/or receiving tokens corresponding to calls between the third-party system and call routing system 320.

In block 208, the call routing system 320 may, in response to receiving an indication that the third-party system accepts the first user, connect the first user to the first caller. The third-party system (e.g., third-party system 460) may choose to accept or decline the first user based on the information or portion of data transmitted to the third-party system in block 207. If the third-party system declines the first user (or the offer of the first user), the method may end, or call routing system 320 may transmit, to the third-party system, different user data regarding a different user (or a different offer). If the third-party system accepts the first user, the third-party system may transfer the call to call system 408, call routing system 320 and/or associated systems. Call routing system 320 may connect the first user to the first caller using the connection provided by the third-party system. Accordingly, block 208 may otherwise be similar to block 108 and the respective description of block 108 is not repeated herein for brevity.

In block 215, the call routing system 320 may transmit a second portion of the user data associated with the second user to the third-party system. After selecting the second user in block 214 (e.g., via highest bid, availability, etc.), the call routing system 320 may transmit a portion of the user data associated with the second user to the third-party system (e.g., third-party system 460) for approval. In some embodiments, this may include transmitting an indication of a bid amount (or a portion of a bid amount) to the third-party system. In some embodiments, the transmission of this second stage of user data to the third-party system for approval may be optional.

In block 216, the call routing system 320 may in response to receiving an indication that the third-party system accepts the second user, connect the second user to the first caller. The third-party system (e.g., third-party system 460) may choose to accept or decline the second user based on the information or portion of data transmitted to the third-party system in block 207. In some embodiments, the second bid amount (e.g., transmitted at block 215) may be different from the first bid amount (e.g., transmitted at block 207). The third-party system may be configured to accept a different amount for the second bid (e.g., at block 216) relative to the first bid (e.g., at block 208). If the third-party system declines the second user (or the offer of the second user), the method may end, or call routing system 320 may transmit, to the third-party system, different user data regarding a different user (or a different offer). If the third-party system accepts the second user, call routing system 320 may connect the second user to the first caller. Accordingly, block 216 may otherwise be similar to block 116 and the respective description of block 108 is not repeated herein for brevity. In some embodiments, the approval of the second user by the third-party system may be optional, and call routing system 320 may automatically connect the second user to the first caller without approval from the third-party system.

Figure 3:
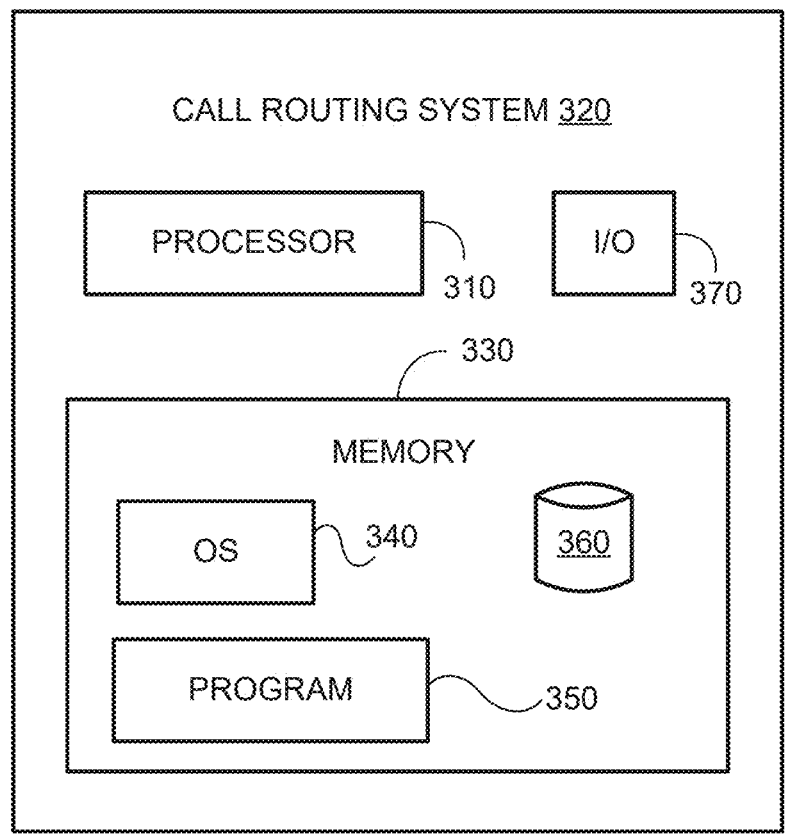
FIG. 3 is a block diagram of an example call routing system used to provide analyzing and redirecting active calls, according to an example implementation of the disclosed technology.
Figure 4:
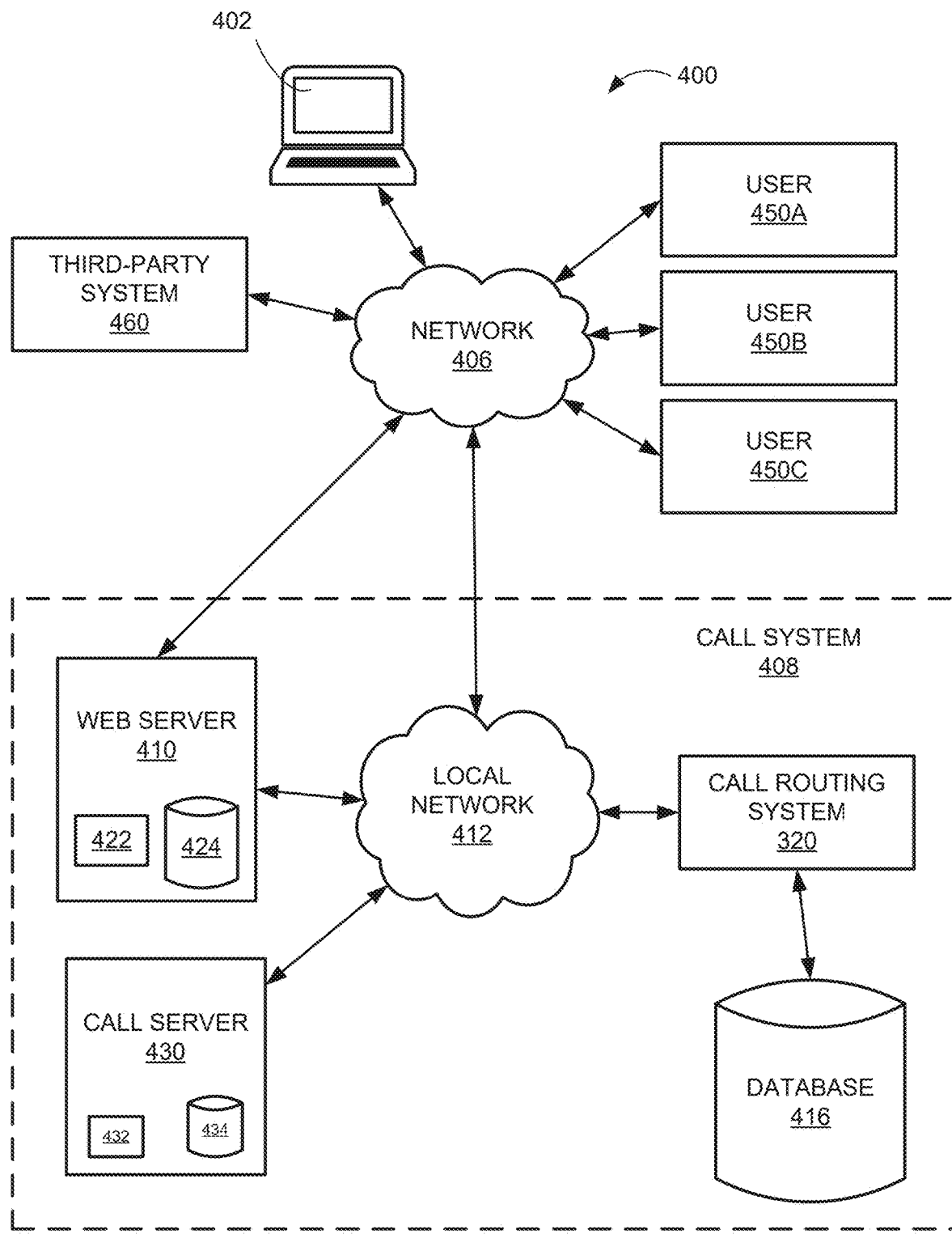
FIG. 4 is a block diagram of an example system that may be used to provide analyzing and redirecting active calls, according to an example implementation of the disclosed technology.

FIG. 3 is a block diagram of an example call routing system 320 used to analyze and redirect active calls according to an example implementation of the disclosed technology. According to some embodiments, the user device 402 and web server 410, as depicted in FIG. 4 and described below, may have a similar structure and components that are similar to those described with respect to call routing system 320 shown in FIG. 3. As shown, the call routing system 320 may include a processor 310, an input/output (I/O) device 370, a memory 330 containing an operating system (OS) 340 and a program 350. In certain example implementations, the call routing system 320 may be a single server or may be configured as a distributed computer system including multiple servers or computers that interoperate to perform one or more of the processes and functionalities associated with the disclosed embodiments. In some embodiments call routing system 320 may be one or more servers from a serverless or scaling server system. In some embodiments, the call routing system 320 may further include a peripheral interface, a transceiver, a mobile network interface in communication with the processor 310, a bus configured to facilitate communication between the various components of the call routing system 320, and a power source configured to power one or more components of the call routing system 320.

A peripheral interface, for example, may include the hardware, firmware and/or software that enable(s) communication with various peripheral devices, such as media drives (e.g., magnetic disk, solid state, or optical disk drives), other processing devices, or any other input source used in connection with the disclosed technology. In some embodiments, a peripheral interface may include a serial port, a parallel port, a general-purpose input and output (GPIO) port, a game port, a universal serial bus (USB), a micro-USB port, a high-definition multimedia interface (HDMI) port, a video port, an audio port, a Bluetooth™ port, a near-field communication (NFC) port, another like communication interface, or any combination thereof.

In some embodiments, a transceiver may be configured to communicate with compatible devices and ID tags when they are within a predetermined range. A transceiver may be compatible with one or more of: radio-frequency identification (RFID), NFC, Bluetooth™ low-energy Bluetooth™ (BLE), WiFi™, ZigBee™, ambient backscatter communications (ABC) protocols or similar technologies.

A mobile network interface may provide access to a cellular network, the Internet, or another wide-area or local area network. In some embodiments, a mobile network interface may include hardware, firmware, and/or software that allow(s) the processor(s) 310 to communicate with other devices via wired or wireless networks, whether local or wide area, private or public, as known in the art. A power source may be configured to provide an appropriate alternating current (AC) or direct current (DC) to power components.

The processor 310 may include one or more of a microprocessor, microcontroller, digital signal processor, co-processor or the like or combinations thereof capable of executing stored instructions and operating upon stored data. The memory 330 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein may be implemented as a combination of executable instructions and data stored within the memory 330.

The processor 310 may be one or more known processing devices, such as, but not limited to, a microprocessor from the Core™ family manufactured by Intel™, the Ryzen™ family manufactured by AMD™, or a system-on-chip processor using an ARM™ or other similar architecture. The processor 310 may constitute a single core or multiple core processor that executes parallel processes simultaneously, a central processing unit (CPU), an accelerated processing unit (APU), a graphics processing unit (GPU), a microcontroller, a digital signal processor (DSP), a field-programmable gate array (FPGA), an application-specific integrated circuit (ASIC) or another type of processing component. For example, the processor 310 may be a single core processor that is configured with virtual processing technologies. In certain embodiments, the processor 310 may use logical processors to simultaneously execute and control multiple processes. The processor 310 may implement virtual machine (VM) technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

In accordance with certain example implementations of the disclosed technology, the call routing system 320 may include one or more storage devices configured to store information used by the processor 310 (or other components) to perform certain functions related to the disclosed embodiments. In one example, the call routing system 320 may include the memory 330 that includes instructions to enable the processor 310 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

The call routing system 320 may include a memory 330 that includes instructions that, when executed by the processor 310, perform one or more processes consistent with the functionalities disclosed herein. Methods, systems, and articles of manufacture consistent with disclosed embodiments are not limited to separate programs or computers configured to perform dedicated tasks. For example, the call routing system 320 may include the memory 330 that may include one or more programs 350 to perform one or more functions of the disclosed embodiments. For example, in some embodiments, the call routing system 320 may additionally manage dialogue and/or other interactions with the customer via a program 350.

The processor 310 may execute one or more programs 350 located remotely from the call routing system 320. For example, the call routing system 320 may access one or more remote programs that, when executed, perform functions related to disclosed embodiments.

The memory 330 may include one or more memory devices that store data and instructions used to perform one or more features of the disclosed embodiments. The memory 330 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational or non-relational databases. The memory 330 may include software components that, when executed by the processor 310, perform one or more processes consistent with the disclosed embodiments. In some embodiments, the memory 330 may include a call routing system database 360 for storing related data to enable the call routing system 320 to perform one or more of the processes and functionalities associated with the disclosed embodiments.

The call routing system database 360 may include stored data relating to status data (e.g., average session duration data, location data, idle time between sessions, and/or average idle time between sessions) and historical status data. According to some embodiments, the functions provided by the call routing system database 360 may also be provided by a database that is external to the call routing system 320, such as the database 416 as shown in FIG. 4.

The call routing system 320 may also be communicatively connected to one or more memory devices (e.g., databases) locally or through a network. The remote memory devices may be configured to store information and may be accessed and/or managed by the call routing system 320. By way of example, the remote memory devices may be document management systems, Microsoft™ SQL database, SharePoint™ databases, Oracle™ databases, Sybase™ databases, or other relational or non-relational databases. Systems and methods consistent with disclosed embodiments, however, are not limited to separate databases or even to the use of a database.

The call routing system 320 may also include one or more I/O devices 370 that may comprise one or more interfaces for receiving signals or input from devices and providing signals or output to one or more devices that allow data to be received and/or transmitted by the call routing system 320. For example, the call routing system 320 may include interface components, which may provide interfaces to one or more input devices, such as one or more keyboards, mouse devices, touch screens, track pads, trackballs, scroll wheels, digital cameras, microphones, sensors, and the like, that enable the call routing system 320 to receive data from a user (such as, for example, via the user device 402).

In examples of the disclosed technology, the call routing system 320 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

The call routing system 320 may contain programs that train, implement, store, receive, retrieve, and/or transmit one or more machine learning models. Machine learning models may include a neural network model, a generative adversarial model (GAN), a recurrent neural network (RNN) model, a deep learning model (e.g., a long short-term memory (LSTM) model), a random forest model, a convolutional neural network (CNN) model, a support vector machine (SVM) model, logistic regression, XGBoost, and/or another machine learning model. Models may include an ensemble model (e.g., a model comprised of a plurality of models). In some embodiments, training of a model may terminate when a training criterion is satisfied. Training criterion may include a number of epochs, a training time, a performance metric (e.g., an estimate of accuracy in reproducing test data), or the like. The call routing system 320 may be configured to adjust model parameters during training. Model parameters may include weights, coefficients, offsets, or the like. Training may be supervised or unsupervised.

The call routing system 320 may be configured to train machine learning models by optimizing model parameters and/or hyperparameters (hyperparameter tuning) using an optimization technique, consistent with disclosed embodiments. Hyperparameters may include training hyperparameters, which may affect how training of the model occurs, or architectural hyperparameters, which may affect the structure of the model. An optimization technique may include a grid search, a random search, a gaussian process, a Bayesian process, a Covariance Matrix Adaptation Evolution Strategy (CMA-ES), a derivative-based search, a stochastic hill-climb, a neighborhood search, an adaptive random search, or the like. The call routing system 320 may be configured to optimize statistical models using known optimization techniques.

Furthermore, the call routing system 320 may include programs configured to retrieve, store, and/or analyze properties of data models and datasets. For example, call routing system 320 may include or be configured to implement one or more data-profiling models. A data-profiling model may include machine learning models and statistical models to determine the data schema and/or a statistical profile of a dataset (e.g., to profile a dataset), consistent with disclosed embodiments. A data-profiling model may include an RNN model, a CNN model, or other machine-learning model.

The call routing system 320 may include algorithms to determine a data type, key-value pairs, row-column data structure, statistical distributions of information such as keys or values, or other property of a data schema may be configured to return a statistical profile of a dataset (e.g., using a data-profiling model). The call routing system 320 may be configured to implement univariate and multivariate statistical methods. The call routing system 320 may include a regression model, a Bayesian model, a statistical model, a linear discriminant analysis model, or other classification model configured to determine one or more descriptive metrics of a dataset. For example, call routing system 320 may include algorithms to determine an average, a mean, a standard deviation, a quantile, a quartile, a probability distribution function, a range, a moment, a variance, a covariance, a covariance matrix, a dimension and/or dimensional relationship (e.g., as produced by dimensional analysis such as length, time, mass, etc.) or any other descriptive metric of a dataset.

The call routing system 320 may be configured to return a statistical profile of a dataset (e.g., using a data-profiling model or other model). A statistical profile may include a plurality of descriptive metrics. For example, the statistical profile may include an average, a mean, a standard deviation, a range, a moment, a variance, a covariance, a covariance matrix, a similarity metric, or any other statistical metric of the selected dataset. In some embodiments, call routing system 320 may be configured to generate a similarity metric representing a measure of similarity between data in a dataset. A similarity metric may be based on a correlation, covariance matrix, a variance, a frequency of overlapping values, or other measure of statistical similarity.

The call routing system 320 may be configured to generate a similarity metric based on data model output, including data model output representing a property of the data model. For example, call routing system 320 may be configured to generate a similarity metric based on activation function values, embedding layer structure and/or outputs, convolution results, entropy, loss functions, model training data, or other data model output). For example, a synthetic data model may produce first data model output based on a first dataset and a produce data model output based on a second dataset, and a similarity metric may be based on a measure of similarity between the first data model output and the second-data model output. In some embodiments, the similarity metric may be based on a correlation, a covariance, a mean, a regression result, or other similarity between a first data model output and a second data model output. Data model output may include any data model output as described herein or any other data model output (e.g., activation function values, entropy, loss functions, model training data, or other data model output). In some embodiments, the similarity metric may be based on data model output from a subset of model layers. For example, the similarity metric may be based on data model output from a model layer after model input layers or after model embedding layers. As another example, the similarity metric may be based on data model output from the last layer or layers of a model.

The call routing system 320 may be configured to classify a dataset. Classifying a dataset may include determining whether a dataset is related to another datasets. Classifying a dataset may include clustering datasets and generating information indicating whether a dataset belongs to a cluster of datasets. In some embodiments, classifying a dataset may include generating data describing the dataset (e.g., a dataset index), including metadata, an indicator of whether data element includes actual data and/or synthetic data, a data schema, a statistical profile, a relationship between the test dataset and one or more reference datasets (e.g., node and edge data), and/or other descriptive information. Edge data may be based on a similarity metric. Edge data may and indicate a similarity between datasets and/or a hierarchical relationship (e.g., a data lineage, a parent-child relationship). In some embodiments, classifying a dataset may include generating graphical data, such as anode diagram, a tree diagram, or a vector diagram of datasets. Classifying a dataset may include estimating a likelihood that a dataset relates to another dataset, the likelihood being based on the similarity metric.

The call routing system 320 may include one or more data classification models to classify datasets based on the data schema, statistical profile, and/or edges. A data classification model may include a convolutional neural network, a random forest model, a recurrent neural network model, a support vector machine model, or another machine learning model. A data classification model may be configured to classify data elements as actual data, synthetic data, related data, or any other data category. In some embodiments, call routing system 320 is configured to generate and/or train a classification model to classify a dataset, consistent with disclosed embodiments.

The call routing system 320 may also contain one or more prediction models. Prediction models may include statistical algorithms that are used to determine the probability of an outcome, given a set amount of input data. For example, prediction models may include regression models that estimate the relationships among input and output variables. Prediction models may also sort elements of a dataset using one or more classifiers to determine the probability of a specific outcome. Prediction models may be parametric, non-parametric, and/or semi-parametric models.

In some examples, prediction models may cluster points of data in functional groups such as "random forests." Random Forests may comprise combinations of decision tree predictors. (Decision trees may comprise a data structure mapping observations about something, in the "branch" of the tree, to conclusions about that thing's target value, in the "leaves" of the tree.) Each tree may depend on the values of a random vector sampled independently and with the same distribution for all trees in the forest. Prediction models may also include artificial neural networks. Artificial neural networks may model input/output relationships of variables and parameters by generating a number of interconnected nodes which contain an activation function. The activation function of a node may define a resulting output of that node given an argument or a set of arguments. Artificial neural networks may generate patterns to the network via an 'input layer', which communicates to one or more "hidden layers" where the system determines regressions via a weighted connections. Prediction models may additionally or alternatively include classification and regression trees, or other types of models known to those skilled in the art. To generate prediction models, the call routing system 320 may analyze information applying machine-learning methods.

While the call routing system 320 has been described as one form for implementing the techniques described herein, other, functionally equivalent, techniques may be employed. For example, some or all of the functionality implemented via executable instructions may also be implemented using firmware and/or hardware devices such as application specific integrated circuits (ASICs), programmable logic arrays, state machines, etc. Furthermore, other implementations of the call routing system 320 may include a greater or lesser number of components than those illustrated.

FIG. 4 is a block diagram of an example system that may be used to configured, view, and interact with call system 408, according to an example implementation of the disclosed technology. The components and arrangements shown in FIG. 4 are not intended to limit the disclosed embodiments as the components used to implement the disclosed processes and features may vary. As shown, call system 408 may interact with a user device 402 and/or users 450a, 450b, 450c, and a third-party system 460 via a network 406. In certain example implementations, the call system 408 may include a local network 412, a call routing system 320, a web server 410, a call server 430, and a database 416.

In some embodiments, a user may operate the user device 402, which may be an administrative user device. The user device 402 can include one or more of a mobile device, smart phone, general purpose computer, tablet computer, laptop computer, telephone, public switched telephone network (PSTN) landline, smart wearable device, voice command device, other mobile computing device, or any other device capable of communicating with the network 406 and ultimately communicating with one or more components of the call system 408. In some embodiments, the user device 402 may include or incorporate electronic communication devices for hearing or vision impaired users. The administrative user device 402 may be capable of changing settings and options, and viewing graphical user interfaces and statistics regarding all other aspects of system 400, call system 408, and call routing system 320. In some embodiments, user 450a, 450b, and 450c may include user devices similar to user device 402, and may have similar administrative permissions and options to user device 402. Users 450a, 450b, and 450c may be buyers of incoming calls to call system 408 and/or call routing system 320. In some embodiments, users 450a, 450b, and 450c could be external to call system 408, or may be part of (e.g., internal to) call system 408.

Users may include individuals such as, for example, subscribers, clients, prospective clients, or customers of an entity associated with an organization, such as individuals who have obtained, will obtain, or may obtain a product, service, or consultation from or conduct a transaction in relation to an entity associated with the call system 408. According to some embodiments, the user device 402 may include an environmental sensor for obtaining audio or visual data, such as a microphone and/or digital camera, a geographic location sensor for determining the location of the device, an input/output device such as a transceiver for sending and receiving data, a display for displaying digital images, one or more processors, and a memory in communication with the one or more processors.

The call routing system 320 may include programs (scripts, functions, algorithms) to configure data for visualizations and provide visualizations of datasets and data models on the user device 402. This may include programs to generate graphs and display graphs. The call routing system 320 may include programs to generate histograms, scatter plots, time series, or the like on the user device 402. The call routing system 320 may also be configured to display properties of data models and data model training results including, for example, architecture, loss functions, cross entropy, activation function values, embedding layer structure and/or outputs, convolution results, node outputs, or the like on the user device 402.

The network 406 may be of any suitable type, including individual connections via the internet such as cellular or WiFi networks. In some embodiments, the network 406 may connect terminals, services, and mobile devices using direct connections such as RFID, NFC, Bluetooth™ BLE, WiFi™, ZigBee™, ABC protocols, USB, WAN, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

The network 406 may include any type of computer networking arrangement used to exchange data. For example, the network 406 may be the Internet, a private data network, virtual private network (VPN) using a public network, and/or other suitable connection(s) that enable(s) components in the system 400 environment to send and receive information between the components of the system 400. The network 406 may also include a PSTN and/or a wireless network.

The call system 408 may be associated with and optionally controlled by one or more entities such as a business, corporation, individual, partnership, or any other entity that provides one or more of goods, services, and consultations to individuals such as customers. In some embodiments, the call system 408 may be controlled by a third party on behalf of another business, corporation, individual, partnership. The call system 408 may include one or more servers and computer systems for performing one or more functions associated with products and/or services that the organization provides.

Web server 410 may include a computer system configured to generate and provide one or more websites accessible to customers, as well as any other individuals involved in access system 408's normal operations. Web server 410 may include a computer system configured to receive communications from user device 402 via for example, a mobile application, a chat program, an instant messaging program, a voice-to-text program, an SMS message, email, or any other type or format of written or electronic communication. Web server 410 may have one or more processors 422 and one or more web server databases 424, which may be any suitable repository of website data. Information stored in web server 410 may be accessed (e.g., retrieved, updated, and added to) via local network 412 and/or network 406 by one or more devices or systems of system 400. In some embodiments, web server 410 may host websites or applications that may be accessed by the user device 402. For example, web server 410 may host a financial service provider website that a user device may access by providing an attempted login that are authenticated by the call routing system 320. According to some embodiments, web server 410 may include software tools, similar to those described with respect to user device 402 above, that may allow web server 410 to obtain network identification data from user device 402. The web server may also be hosted by an online provider of website hosting, networking, cloud, or backup services, such as Microsoft Azure™ or Amazon Web Services™.

The local network 412 may include any type of computer networking arrangement used to exchange data in a localized area, such as WiFi, Bluetooth™, Ethernet, and other suitable network connections that enable components of the call system 408 to interact with one another and to connect to the network 406 for interacting with components in the system 400 environment. In some embodiments, the local network 412 may include an interface for communicating with or linking to the network 406. In other embodiments, certain components of the call system 408 may communicate via the network 406, without a separate local network 406.

The call system 408 may be hosted in a cloud computing environment (not shown). The cloud computing environment may provide software, data access, data storage, and computation. Furthermore, the cloud computing environment may include resources such as applications (apps), VMs, virtualized storage (VS), or hypervisors (HYP). User device 402 may be able to access call system 408 using the cloud computing environment. User device 402 may be able to access call system 408 using specialized software. The cloud computing environment may eliminate the need to install specialized software on user device 402.

In accordance with certain example implementations of the disclosed technology, the call system 408 may include one or more computer systems configured to compile data from a plurality of sources the call routing system 320, web server 410, and/or the database 416. The call routing system 320 may correlate compiled data, analyze the compiled data, arrange the compiled data, generate derived data based on the compiled data, and store the compiled and derived data in a database such as the database 416. According to some embodiments, the database 416 may be a database associated with an organization and/or a related entity that stores a variety of information relating to customers, transactions, ATM, and business operations. The database 416 may also serve as a back-up storage device and may contain data and information that is also stored on, for example, database 360, as discussed with reference to FIG. 3.

Embodiments consistent with the present disclosure may include datasets. Datasets may comprise actual data reflecting real-world conditions, events, and/or measurements. However, in some embodiments, disclosed systems and methods may fully or partially involve synthetic data (e.g., anonymized actual data or fake data). Datasets may involve numeric data, text data, and/or image data. For example, datasets may include call data, transaction data, financial data, demographic data, public data, government data, environmental data, traffic data, network data, transcripts of video data, genomic data, proteomic data, and/or other data. Datasets of the embodiments may be in a variety of data formats including, but not limited to, PARQUET, AVRO, SQLITE, POSTGRESQL, MYSQL, ORACLE, HADOOP, CSV, JSON, PDF, JPG, BMP, and/or other data formats.

Datasets of disclosed embodiments may have a respective data schema (e.g., structure), including a data type, key-value pair, label, metadata, field, relationship, view, index, package, procedure, function, trigger, sequence, synonym, link, directory, queue, or the like. Datasets of the embodiments may contain foreign keys, for example, data elements that appear in multiple datasets and may be used to cross-reference data and determine relationships between datasets. Foreign keys may be unique (e.g., a personal identifier) or shared (e.g., a postal code). Datasets of the embodiments may be "clustered," for example, a group of datasets may share common features, such as overlapping data, shared statistical properties, or the like. Clustered datasets may share hierarchical relationships (e.g., data lineage).

With continued reference to FIG. 4, the call server 430 may include a computer system configured to receive, process, and route telephone calls and other electronic communications between a customer or user operating a user device 402 and the call routing system 320. The call server 430 may have one or more processors 432 and one or more call databases 434, which may be any suitable repository of call data. Information stored in the call server 430 may be accessed (e.g., retrieved, updated, and added to) via the local network 412 (and/or network 406) by one or more devices of the system 400. In some embodiments, the call server processor 432 may be used to implement an interactive voice response (IVR) system that interacts with the user over the phone or via a voice/audio call portion of an associated mobile application on the user device 402.

Although the preceding description describes various functions of a web server 410, a call routing system 320, a database 416, a call server 430, and agent device 440 in some embodiments, some or all of these functions may be carried out by a single computing device.

In some embodiments, phone call reception and routing may be handled by an external server or service, which may be directed through instructions provided by system 400, call system 408, and/or call routing system 320. The external service may be an external communications service (e.g., Twilio) that allows for communications via web service API. System 400, call system 408, call routing system 320 may receive and transmit messages via the APIs to the external communications service to control the routing of calls and receive information regarding calls (e.g., incoming calls from callers). For example, a call may be received via a public switched telephone network (PSTN) via an external communication service (e.g., Twilio) and transmitted to call routing system 320 via voice over internet protocol (VoIP). Call routing system 320 may receive the call or an indication of the call and information about the call from the other constituent parts of the call system (e.g., call system 408), call server, (e.g., call server 430), a third-party system (e.g., third-party system 460), or an external server or service. The external server or service may replace or supplement call server 430.

The system may include a third-party system 460, which may be an adjacent call system similar to call system 408. Third-party system 460 may be capable of interacting with and transferring calls to call system 408. In some embodiments, third-party system 460 may be handled by the external service described above. The call routing system 320 and/or call system 408 may route the call via a VOIP to users or may direct a third-party system 460 to route the call to users via a VOIP.

FIG. 5 is a flow diagram illustrating an exemplary method 500 for analyzing and redirecting active calls, in accordance with certain embodiments of the disclosed technology. The steps of method 500 may be performed by one or more components of the system 400 (e.g., call routing system 320 or web server 410 of call system 408 or user device 402), as described in more detail with respect to FIGS. 3 and 4.

Method 500 of FIG. 5 is similar to method 100 of FIG. 1. The descriptions of blocks 502, 504, 506, 508, 510, 512, 514, and 516 in method 500 are similar to the respective descriptions of blocks 102, 104, 106, 108, 110, 112, 114, and 116 of method 100 and are not repeated herein for brevity. Method 500 may include additional block 518. FIG. 5 may describe an embodiment for iteratively selecting an additional user after the first user if the first user disconnects from the first call within the first time period. A token may track the first call following method 500 through multiple iterations of blocks 512 through 518 in order to generate statistics.

In block 518, the call routing system 320 may determine whether the additional user disconnected from the first call within an additional time period. The determination in block 518 may be similar to block 510 and the respective description is not repeated herein for brevity. If the additional user disconnected from the first call outside the time period, the method may end. If the additional user disconnected from the first call within an additional time period, the call routing system 320 may return to block 512 or block 514 (in embodiments where block 512 is not used). Call routing system 320 may then perform blocks 512 to 518 iteratively until a user completes the call with the caller for a duration beyond the time period. The number of times the call iterates through blocks 512 to 518 may be controlled via the settings for call routing system 320 via a graphical user interface (e.g., a limit of three users per caller). Call routing system 320 may be able to adjust or vary other settings at each iteration. For example, call routing system 320 may vary the duration of the time period of block 518 or methodology for selecting a user in block 514 (e.g., on the first iteration, the additional user may be chosen via bidding and on the second iteration, the additional user may be chosen via availability). In some embodiments, soliciting bids from users may occur once, and selecting a second user or third user at block 514 may be based on a user's bid received at block 504. In some embodiments, bids may be solicited at each iteration of method 500 either at block 504 or block 512.

For method 500 or other methods disclosed herein (e.g., methods 100, 200, 600), the call routing system 320 may show information about the call via a live (e.g., real-time or near real-time), updating graphical user interface. The graphical user interface may display information to users about one or more calls as the one or more calls are occurring. The graphical user interface may be transmitted to one or more user devices (e.g., user device 402, user 450a, 450b, 450c, or third-party system 460). The information about the one or more calls may be provided by the token or may be generated from data associated with the token. For example, the graphical user interface may include a call log. The call log may display one or more inbound calls. The call log may display one or more outbound calls associated with the one or more inbound calls (e.g., the call log may display a first inbound call associated with a first outbound call to a first user and a second outbound call to a second user). The call log may be organized by the inbound call and allow the user to see outbound calls associated with the inbound calls by selecting a button or menu item. In response to selecting the item or menu button, the call log may expand to reveal the outbound calls associated with the inbound call. The call log may be updated in real-time or near real-time as calls occur (e.g., the graphical user interface displaying the call log may change as a new user is connected at block 516 to show that a second outbound call has been associated with the first incoming call). The call log may show additional information about each leg (e.g., the first outbound call and the second outbound call). For example, the call log may display a time for each call leg, an indication that the call was automatically redirected, an updating timer if a call is ongoing, whether a conversion occurred, and other data. In some cases, the call log may be used for debugging.

Furthermore, the graphical user interface may also include generated and displayed reports. This may include metrics regarding the number of total outbound calls and number of total inbound calls. The metrics may be generated from data associated with tokens for individual calls. The metrics may include filtering with an option to display or not display redirected calls. The metrics may also include different conversion rates. Conversion rates may include an inbound call conversion rate (e.g., the conversion rate measured by all calls inbound), an outbound call conversion rate (e.g., the conversion rate measured by all calls outbound), or other conversion rates. The reports may also include costs per call. The costs may be separated based on whether the user was a first user (e.g., the first outbound call) or a subsequent user (e.g., a redirected outbound call). Costs may be tracked or reported based on the price paid for a connection (e.g., an average cost for a first connection versus an average cost for second connection or subsequent connection). Because the metrics may be updated in real-time or near real-time, the costs or prices for connections reported and displayed to a user via the graphical user interface may inform the user regarding how much to pay for a first connection or second connection. For example, the graphical user interface may be capable of displaying that second connections (e.g., second outbound legs) are inexpensive relative to first connections (e.g., first outbound legs). Therefore, the user may choose a more appropriate price to bid on second connections.

Figure 6:
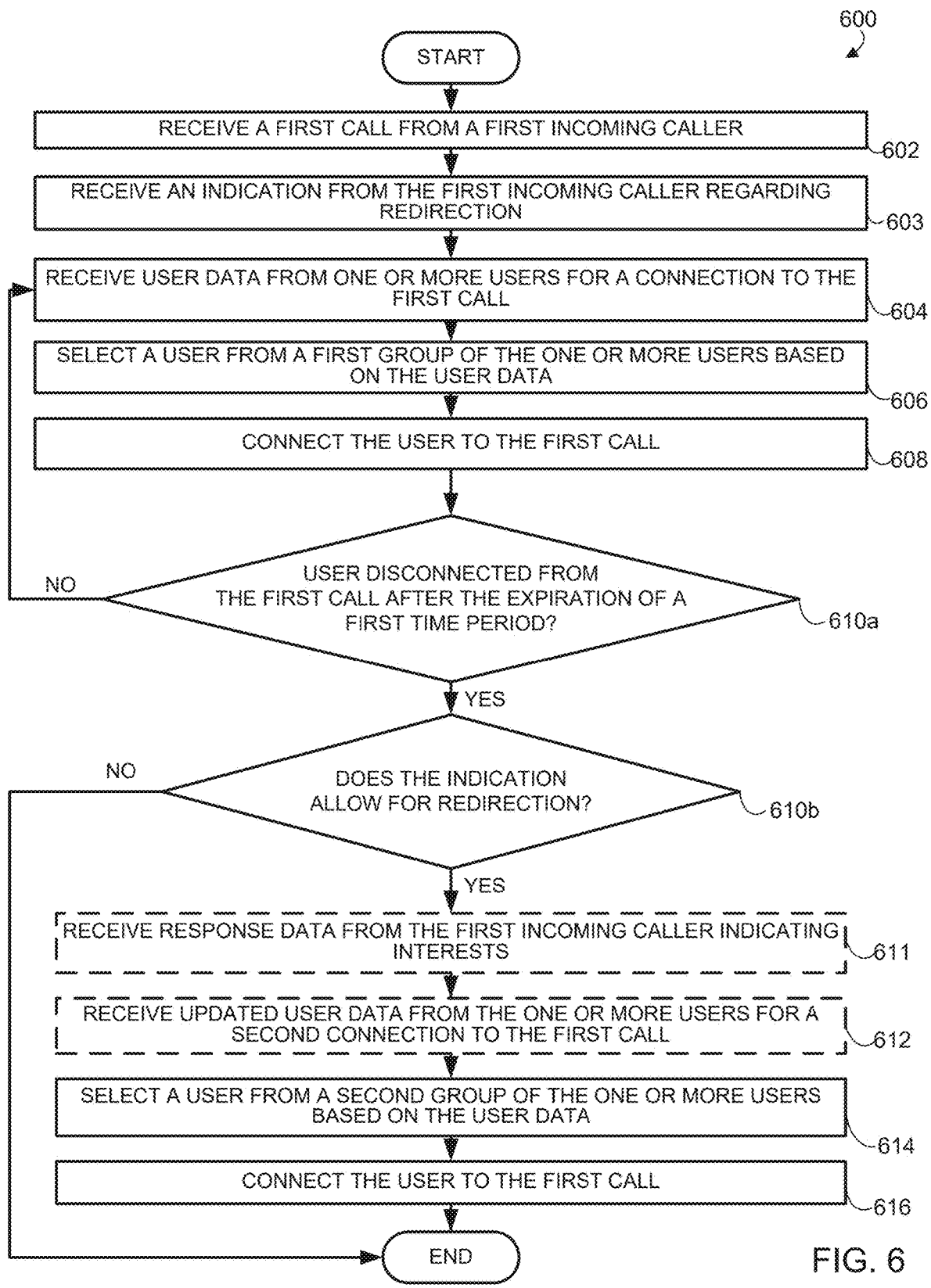
FIG. 6 is a flow diagram illustrating an exemplary method for analyzing and redirecting active calls in accordance with certain embodiments of the disclosed technology.

FIG. 6 is a flow diagram illustrating an exemplary method 600 for analyzing and redirecting active calls, in accordance with certain embodiments of the disclosed technology. The steps of method 600 may be performed by one or more components of the system 400 (e.g., call routing system 320 or web server 410 of call system 408 or user device 402), as described in more detail with respect to FIGS. 3 and 4.

Method 600 of FIG. 6 is similar to method 100 of FIG. 1. The descriptions of blocks 602, 604, 606, 608, 612, 614, and 616 in method 600 are similar to the respective descriptions of blocks 102, 104, 108, 112, 114, and 116 of method 100 and are not repeated herein for brevity. Blocks 610a and 610b may be different from block 110 as further described below. Method 600 may include additional block 603 and optional additional block 611. FIG. 6 may describe an embodiment where an incoming caller may have an option to allow redirection, and the system may redirect the user based on the incoming caller's selection of the option. In some embodiments, method 600 may be used to provide a caller with additional offers or as an alternative option for method 100 if no user for the primary purpose of the call is available.

In block 603, the call routing system 320 may receive data from the first incoming caller regarding redirection. At the beginning of a call with the first incoming caller, the call may begin by message asking the user if they would like to hear additional offers after the first offer is complete. The user may then select an indication whether they would like to hear additional offers. In some embodiments, the user may be able to select the indication by pressing a number selection on their telephone (e.g., press 1 for yes and 2 for no). In some embodiments, the call routing system 320 may utilize an IVR system to detect a vocal indication of the user (e.g., yes or no). The data received may indicate that the first incoming caller is open for redirection to other offers after the first offer (e.g., a first connection with a first user) is complete. The data received may indicate that the first incoming caller is not open to redirection to other offers after the first offer is complete. The data received may be inconclusive whether the caller would like or would not like to receive additional offers (e.g., if the caller does not provide a response).

In some embodiments, if the caller indicates that they are interested in more offers, call routing system 320 may inquire with the user regarding which additional offers they are interested in. For example, using an IVR system, the call routing system 320 may prompt the caller to provide services they are interested in (e.g., "what are additional services you are interested in?"). In some embodiments, the call routing system 320 may prompt the caller by providing a list of products and/or services (e.g., "are you interested in products like health insurance, life insurance, or car insurance?"). The list of products and/or services may be generated from a known list of services provided by assorted users. The call routing system 320 may listen for a response from the caller for keywords matching products and/or services.

Furthermore, the call routing system 320 may determine whether the first user disconnected from the first call within a first predetermined time period and/or whether the indication allows for redirection. In some embodiments, block 610 may be separated into two separate steps (e.g., block 610a—a first step for determining whether the first user disconnected from the first call within a first predetermined time period and block 610b—a second step for determining whether the indication allows for redirection). The call routing system 320 may determine whether the first user disconnected from the first call in a similar manner as described with reference to block 110. Block 610a may be similar to block 110, and the respective description is not repeated herein for brevity. Furthermore, call routing system 320 may consider the indication received in block 603 in determining whether to connect the first caller with a second user or additional user over an additional connection (e.g., the call routing system 320 may use the caller's choice in hearing other options as a consideration in the decision at block 610 regarding whether to connect the caller to an additional user). In some embodiments, the indication from the caller received in block 603 may be definitive. For example, if the caller indicated they did not want to receive additional offers, after the first offer, method 600 may end (shown by the arrow to the end box). Additionally, if the caller indicated they did want to receive additional offers, method 600 may continue to block 611 (e.g., even if a first offer with a first user was successful or unsuccessful). In some embodiments, if call routing system 320 determines that the first user disconnected from the first call within the predetermined time period, the first caller may be routed as described in method 100 or method 500 to locate another similar user who may provide a similar service and/or product (as shown by the arrow returning to block 604). This may repeat until the caller is able to successfully purchase a product or service and/or call routing system 320 determines that a user disconnected from the first call after an expiration of the predetermined time period. Accordingly, if call routing system 320 determines that the first user (or another user) disconnected from the first call after the predetermined time period (potentially indicating a sale of a first product and/or service), the call routing system 320 may determine whether the indication allows for redirection at block 610*b*. After making the determination whether the indication allows for redirection at block 610*b*, the method may proceed to block 611 (if the caller's response indicates the redirection is allowed) or the method may end (if the caller's response indicates the redirection is not allowed). The indication of redirection may be opt-out or opt-in. For example, the indication of redirection may be positive and allow a user to indicate they are interested in additional offers (e.g., that the indication of redirection allows one or more additional offers). Additionally, the indication of redirection may be negative and allow a user to indicate they are not interested in additional offers (e.g., that the indication of redirection prohibits one or more redirections). In some embodiments, the call routing system 320 may determine whether the indication of redirection allows for additional offers or does not prohibit additional offers.

In optional block 611, the call routing system 320 may receive response data from the first incoming caller indicating one or more interests of the first incoming caller. In some embodiments, the call routing system 320 may wait to ask the caller what offers they are interested in until after the connection of the caller to the first user. This may aid in enhancing the conversion of the first user. After the conclusion of the connection with the first user, the call routing system 320 may automatically redirect the inbound leg with the first caller to an IVR system, which may inquire about what products and/or services the caller is interested in. The IVR system may use a transcription and extracted data from the caller's conversation with the first user to suggest products and services a user may be interested in (e.g., "we see that you just moved to Nebraska and purchased home insurance, are you also interested in life insurance?"). The call routing system 320 may match the interests of the caller to one or more groups of users. The groups of users may specialize in providing products and/or services that the caller is interested in.

In some embodiments, if the caller indicates that they are interested in more offers, call routing system 320 may inquire with the user regarding which additional offers they are interested in. For example, using an interactive voice response system, the call routing system 320 may prompt the caller to provide services they are interested in (e.g., "what are additional services you are interested in?"). In some embodiments, the call routing system 320 may prompt the caller by providing a list of products and/or services (e.g., "are you interested in products like health insurance, life insurance, or car insurance?"). The list of products and/or services may be generated from a known list of services provided by assorted users. The call routing system 320 may listen for a response from the caller for keywords matching products and/or services. In embodiments, the call routing system 320 may present the caller with an audio menu for providing prompts and/or indications of interested service. In embodiments, this may be a verbal user interface where the user can verbally express what they are looking for, or verbally express a response to an option. The verbal user interface may be configurable by the user. In some embodiments, the audio menu may allow the user to press buttons on their telephone to signal interests (e.g., "press 1 for car insurance offers, and press 2 for motorcycle insurance offers").

In blocks 612, 614, and 616, the call routing system 320 may determine an appropriate user to connect the caller to based on the information received in block 611. The call routing system 320 may determine the appropriate user to connect with the caller based on information obtained from the conversation between the first user and the caller. For example, the call routing system 320 may generate a transcription of the conversation between the first user and the caller. The call routing system 320 may search the transcription of the conversation for keywords to determine potential interests of the caller (e.g., determine potential sales or purchases the caller may qualify for, such as an insurance plan specific for a person of a certain age) or information about the caller (e.g., if the caller purchased a plan, which plan the caller purchased). The call routing system 320 may provide the transcription of the conversation or information about the caller determined from the transcription to the one or more users. This may allow the caller to connect to a user who can most likely provide a product and/or service that the caller is looking for. The second user (or additional users after the second user) may be connected to the caller as described with reference to other embodiments above. In method 600, the second user (or other subsequent users) connected to the caller may be selling a different product and/or service than the first user (and other subsequent users).

In method 600, blocks 604 to 610*a* may correspond to operations involving a first group of users (e.g., users who may be providing a product and/or service that the user first called about). Blocks 611 through 616 may correspond to operations involving a second group of users (e.g., users who may be providing a product and/or service that the user may optionally hear about or opt-into hearing about). Each group may separately allow for redirection (e.g., if the user disconnects prior to the expiration of the time period at 610*a*, a new user from the first group, providing the original product the user called about is selected using blocks 604 through 608). In method 600, the first user may be chosen or selected from the first group of users and the second user may be chosen or selected from a second group of users. The second group of users may be different from a first group of users (e.g., the group of users selected from and chosen in, for example, blocks 604-608, or reselected from if the first user disconnects from the first call within a first predetermined time period). The second group of users may be focused on selling or providing a different product and/or service than the first group of users. The interests of the caller, provided by the response data received in block 611, may aid call routing system 320 in selecting a second user from the second group of users. Call routing system 320 may provide call data from the call with the first user or other users to the second group of users (or the first group of users, if a redirection regarding the same product and/or service is necessary). The call data may include data associated with and/or relevant to the interests of the caller (e.g., if the caller expresses that they enjoy boating on their 22 foot skiff in the call with the first user, the call routing system 320 may receive a response from the user indicating they are interested in boat insurance at block 611, and the call routing system 320 may provide the information regarding boating and/or boat insurance to users of the second group). In some embodiments, the call data may also be provided to the first group (e.g., if the first outbound leg is unsuccessful at completing a sale).

In some embodiments, method 600 may be used in conjunction with a third-party system, as described with reference to method 200. In some embodiments, method 600 may include a block similar to block 610*a* after block 616 to determine whether a user of a second group was able to complete a sale. If the user of the second group was unable to complete the sale, blocks 611 through 616 may repeat with additional users from the second group.

In some embodiments, if the caller expresses multiple interests (e.g., interests match multiple product lines), method 600 may be used to redirect the caller to multiple other groups of users after a successful call with the second group. Using the above example, if selling the caller boat insurance takes 5 minutes, and the caller also expresses interest in snowmobile insurance, the call routing system 320 may redirect the caller to a user in a third group of users providing snowmobile insurance (e.g., the system may use the time with the user selling boat insurance to infer that the call was successful). Call routing system 320 may redirect the caller to a user in the same group if a call is determined to be unsuccessful (e.g., if the time with the user is short, for example, less than 30 seconds).

In some embodiments, method 600 may include utilize an AI agent or IVR system. The AI agent or IVR system may be similar to that of method 100, 200, or 500. If call routing system 320 receives response data from the caller indicating interests at block 611, and the call routing system 320 is unable to match the caller's interests to a group of users, the call routing system 320 may connect the user to an AI agent. The AI agent may be capable of indicating to caller to further specify what they are interested in or may indicate to the caller that the agent will locate and/or search for additional offers and/or users and call the user back. Once the call routing system 320 locates a user that aligns with the caller's interests, call routing system 320 may be capable of calling the caller and connecting the caller with the user.

In some embodiments, method 600 may utilize control options as described above with respect to method 100 to aid in call routing. For example, the control options may include: (1) a user manual control option (e.g., where the user is able to directly the redirection options); (2) a rule-based automatic control option (e.g., where the call routing system 320 uses a set of rules to automatically control the presented redirection options); and (3) a machine learning model automatic control option (e.g., where the call routing system 320 includes one or more machine learning models that determines which redirection options to present to the caller). The user may be able to select from one or more of these control options via the graphical user interface to change how the call routing system 320 operates (e.g., the control options may generate redirection options which are presented to the caller). The graphical user interface may also include a suggestion or recommendation feature, which may appear next to control option, which may provide recommendations to the user regarding how to improve their redirection options based on reviewed data. The caller may choose specific redirection options based on their interests.

With the user manual control option, the user may directly be able to set redirection options presented to the caller (e.g., always presenting options for life insurance at block 611).

In some embodiments, the call routing system 320 may include a rule-based automatic control option. The rule-based automatic control option may optimize the call routing based on data received (e.g., data tracked via one or more tokens) regarding previous calls. The rule-based automatic control option may be configured by the user via the graphical user interface to route the call (e.g., present redirection options) based on earnings per call, a conversion percentage, a conversion dollar amount, a conversion time-frame. The rule-based automatic control option may use a set of linear equations and linear optimizations to determine the best options for a redirection. The rule-based automatic control option may operate in real-time, and may be capable of changing options for redirection in real-time as more data is received regarding callers. The automatic control options (e.g., rule-based or machine learning model) may be used to generate one or more redirection options for the caller to choose from. The automatic control options may choose or select a specific order for the redirection options for the caller. The redirection options or the order selected may be based on historical data, data from other callers, token data. The data used may be used to optimize the presentation of the redirection options to the caller (e.g., presenting the redirection option that the user is anticipated to be most interested in first).

In some embodiments, the call routing system 320 may include a machine learning model automatic control option. The machine learning model automatic control option may be configured by the user via the graphical user interface. The machine learning model automatic control option may be trained with data from pervious incoming calls. The training may be specific to specific users, groups of users, or users offering a specific product type. The machine learning model automatic control option may include one or more machine learning models, and the one or more machine learning models may utilize linear regression model, decision trees, neural networks and/or reinforcement learning. In some embodiments, the linear regression model may be used to predict an outcome based on the caller, and use the outcome to determine an offer the caller may be interested in based on data from previous callers (e.g., previous callers who purchased health insurance were also interested in pet insurance). In some embodiments, neural networks may be used to recognize non-linear aspects regarding callers (e.g., an age of the caller, and the offer selected as related to a specific offer the caller may be interested in). Accordingly, utilizing prior call data from previous callers allows for the collection of hundreds to thousands of data points (e.g., duration of call, the time of day of the call). By utilizing an automatic control option (e.g., rule-based automatic control option or machine learning model automatic control option), call routing system 320 may have improved performance, may route callers for effectively (e.g., by providing more useful options for redirection), and may select better users to route callers to (e.g., route callers to agents that are more appropriate to the callers needs by better mapping callers to user services). By utilizing automatic control options with many data points, changes to call routing may be made in real-time using the token data received from ongoing and previous calls, thereby allowing previous call data to automatic enhance the routing of future and ongoing calls.

EXAMPLE USE CASE

The following example use case describes an example of a typical user flow pattern. This section is intended solely for explanatory purposes and not in limitation.

In one example, a caller is interested in purchasing health insurance and sees an advertisement on an internet website displaying a product in which the caller is interested. The advertisement contains a phone number, which the user selects on her smartphone's touch screen, causing the smartphone to dial the phone number. The phone number connects the caller to call routing system 320, which receives the call via an external call server (e.g., block 102 in FIG. 1). Because the call contains a live lead, call routing system 320 communicates to potentially interested buyers that a lead is available. Accordingly, call routing system 320 receives buyer data from three interested buyers for the lead, Buyer 1, Buyer 2, and Buyer 3 (e.g., block 104 in FIG. 1). Buyer 1 sends buyer data to the call routing system 320 including a bid of $5.00; Buyer 2 sends buyer data to the call routing system including a bid of $10.00; and Buyer 3 sends buyer data to the call routing system including a bid of $8.00. The call routing system 320 then selects Buyer 2 based on the received buyer data because Buyer 2's bid of $10.00 is greater than the other bids of $5.00, and $8.00 (e.g., block 106 in FIG. 1). Call routing system 320 then connects Buyer 2 to the caller (e.g., block 108 in FIG. 1). During the conversation with the caller, Buyer 2 realizes that the caller is interested in Medicare supplement insurance, which Buyer 2 does not sell. Buyer 2 then disconnects from the call 28 seconds after being connected to the caller. Call routing system 320, monitoring the call during this time, determines that Buyer 2 disconnected from the call in less than 30 seconds after being connected (e.g., block 110 in FIG. 1). Therefore, the call routing system 320 maintains the same call with the caller. The call routing system selects Buyer 3 based on the buyer data, as Buyer 3 submitted the second greatest bid (e.g., block 114 in FIG. 1). In other examples, the system may consider the product that the caller is interested in or other data obtained in connection with the caller and/or call, and select a new buyer based at least in part on how buyer data aligns with the caller and/or call data (e.g., to maximize the likelihood that the caller is connected to a buyer offering the desired product or service). Call routing system 320 then connects Buyer 3 to the caller over the same call (e.g., block 116 in FIG. 1). The call lasts for five additional minutes before Buyer 3 disconnects from the call. Since the connection with Buyer 3 is longer than the 30 second threshold, call routing system 320 allows the call with caller to end without attempting another reconnection. From the caller's perspective, the caller clicked on the internet advertisement to trigger a single call, initially spoke to one company (Buyer 2) who was not the appropriate fit, and seamlessly transitioned to another company (Buyer 3) who offered the desired product. Without the reconnection, the caller would have needed to call in again and potentially would have been routed to Buyer 2 again, ultimately wasting the caller and Buyer 2's time and not converting to a sale. Furthermore, without the reconnection, the caller would have hung up after being unsatisfied with Buyer 2, and the caller potentially would not have called again, which would not have resulted in a conversion (for Buyer 3 or another buyer). By using the present system, tracking the call (e.g., via a call session token) in real-time, and detecting when Buyer 2 disconnected, the system dynamically rerouted the caller to Buyer 3, therefore connecting the caller with a needed service, and providing Buyer 3 with a sale. Through the call tracking, both Buyer 2 and Buyer 3 are able to visualize metrics on the call with the caller and other calls.

In a second example, a caller is interested in purchasing car insurance and clicks on a website link which causes the caller's mobile device to call a phone number (e.g., block 602). The caller is connected to the call response system 320. The call response system 320 asks the caller if they are open to receiving other offers after the first offer is complete. The caller answers "yes" (e.g., block 603). The call response system 320 transmits a signal to a first group of users selling car insurance indicating that a caller is available. The call response system 320 receives user data from three users selling car insurance (e.g., block 604). The call response system 320 selects a first user from the three users (e.g., block 606) because the first user specializes in car insurance for young drivers, and the caller, according to data retrieved by call response system 320, is 18 years old. The call response system 320 then connects the user to the first call (e.g., block 608). The caller is connected with the first user for 5 minutes and purchases a new car insurance policy. The call response system 320 determines that the user disconnected from the first call after the expiration of the first time period since the call lasted 5 minutes and the time period is 30 seconds (e.g., block 610*a*). The call response system 320 then determines that the indication from the user provided earlier allows for redirection (e.g., block 610*b*). The call response system 320 then asks the caller what other offers they may be interested in, prompting the caller by saying "are there any other products that you are interested in? We can also provide motorcycle insurance, home insurance, apartment insurance, and others." The caller indicates they are interested in motorcycle insurance (e.g., block 611). The call response system 320 then matches the caller to a second group of users selling motorcycle insurance. The call response system 320 selects a user selling motorcycle insurance based on the car insurance policy that the caller purchased from the first user (e.g., block 614). The call response system 320 then connects the user from the second group selling motorcycle insurance to the caller. Therefore, the call response system 320 allows the caller to connect with multiple users and receive products/services that they may be interested in, but otherwise would not be able to purchase without making separate calls. This makes finding appropriate products and services easier for callers.

In some examples, disclosed systems or methods may involve one or more of the following clauses:

Clause 1: A system comprising: one or more processors; and a memory in communication with the one or more processors and storing instructions that, when executed by the one or more processors, are configured to cause the system to: receive a first call from a first incoming caller; receive user data from one or more users for a first connection to the first call; select a first user from the one or more users based on the user data; connect the first user to the first call; determine whether the first user disconnected from the first call within a first predetermined time period; responsive to determining the first user disconnected from the first call with the first incoming caller within the first predetermined time period: select a second user from the one or more users based on the user data; and connect the second user to the first call.

Clause 2: The system of clause 1, wherein the user data from the one or more users comprises one or more first bids.

Clause 3: The system of clause 2, wherein the memory stores further instructions that, when executed by the one or more processors, are further configured to cause the system to: identify, from the first call, the one or more users; and selecting the first user from the one or more users based on the user data further comprises: selecting the first user based on the highest bid of the one or more first bids.

Clause 4: The system of clause 1, wherein selecting the first user from the one or more users based on the user data further comprises: selecting the first user from the one or more users based on an order of a queue, selecting a first user based on rules-based decisioning, selecting the first user based on availability, or combinations thereof.

Clause 5: The system of clause 1, wherein the memory stores further instructions that, when executed by the one or more processors, are further configured to cause the system to: receive updated user data from the one or more users for a second connection to the first call.

Clause 6: The system of clause 5, wherein the updated user data from the one or more users comprises one or more second bids.

Clause 7: The system of clause 1, wherein determining whether the first user disconnected from the first call within the first predetermined time period further comprises: receiving one or more notifications from a call provider that the first call has ended; and transmitting the one or more notifications to the call provider to continue the first call.

Clause 8: The system of clause 1, wherein connecting the first user to the first call comprises forming a connection between the first caller and an outbound leg to the first user.

Clause 9: The system of clause 1, wherein the memory stores further instructions that, when executed by the one or more processors, are further configured to cause the system to: responsive to determining the first user did not disconnect from the first call within the first predetermined time period or determining the first user disconnected from the first call outside the first predetermined time period, allow the first call to end.

Clause 10: The system of clause 1, wherein the memory stores further instructions that, when executed by the one or more processors, are further configured to cause the system to: determine whether the second user disconnected from the first call within a second predetermined time period; responsive to determining the second user disconnected from the first call within the second predetermined time period: select a third user from the one or more users based on user data; and connect the third user to the first call.

Clause 11: The system of clause 1, wherein the memory stores further instructions that, when executed by the one or more processors, are further configured to cause the system to: calculate statistics for each user, the statistics associated with the first call and comprising at least a ratio of outbound calls to inbound calls, the ratio being greater than one, and earnings per call outbound; generate a first graphical user interface showing the statistics; transmit the first graphical user interface to a first device of the first user and a second device of the second user; receive, via the first graphical user interface, from the first device of the first user, an updated selection of a selectable option indicating a change of routing responsive to determining a future user has disconnected from a future call with a future caller within the first predetermined time period; change the routing for future calls in real time based on the updated selection of the selectable option; and generate an updated graphical user interface showing the updated selection of the selectable option.

Clause 12: A method comprising: receiving, from a third-party system, caller data associated with a first caller, the caller data comprising a contact method; receiving user data from one or more users for a first connection to the first caller via the contact method; selecting a first user from the one or more users based on the user data; transmitting, to the third-party system, at least a first portion of the user data associated with the first user; responsive to the third-party system accepting the first user based on the first portion of the user data, connecting the first user to the first caller using the first connection; determining whether the first user terminated the first connection with the first caller within a first predetermined time period; responsive to determining the first user terminated the first connection with the first caller within the first predetermined time period: selecting a second user of the one or more users based on the user data; transmitting, to the third-party system, at least a second portion of the user data associated with the second user; and responsive to the third-party system accepting the second user based on the second portion of the user data, connecting the second user to the first caller using a second connection.

Clause 13: The method of clause 12, wherein selecting the first user based on the user data further comprises: selecting the first user from the one or more users using an order of a queue, selecting the first user based on rules-based decisioning, selecting the first user based on availability.

Clause 14: The method of clause 12, wherein: connecting the first user to the first caller comprises forming a connection between the first caller and an outbound leg to the first user, and determining whether the first user terminated the first connection with the first caller within the first predetermined time period further comprises: monitoring the first connection for one or more first signals from a call provider indicating the first user has hung up; and transmitting one or more second signals to the call provider to continue the first connection after the first user has hung up.

Clause 15: The method of clause 12, further comprising: responsive to determining the first user did not terminate the first connection with the first caller within the first predetermined time period or determining the first user terminated the first connection with the first caller outside the first predetermined time period, allow the first connection to end.

Clause 16: The method of clause 12, wherein the user data further comprises one or more first bids, and the method further comprises: receiving updated user data comprising one or more second bids, and wherein: the one or more first bids are made in a first round of bidding, and the one or more second bids are made in a second round of bidding.

Clause 17: The method of clause 16, wherein: the first round of bidding is associated with first data regarding the first connection, and the second round of bidding is associated with second data regarding the second connection, the method further comprising: transmitting, to the one or more users, the first data and the second data, and wherein the second data includes information from the first connection.

Clause 18: The method of clause 12, further comprising: determining whether the second user terminated the second connection with the first caller within a second predetermined time period; responsive to determining the second user terminated the second connection with the first caller within the second predetermined time period: selecting a third user of the one or more users based on the user data; and connecting the third user to the first caller.

Clause 19: A method comprising: receiving a first call from a first caller; receiving user data from one or more users for a first connection to the first call; selecting a first user from the one or more users based on the user data; connecting the first user to the first call; determining, using one or more signals, that the first user disconnected from the first call within a first predetermined time period; responsive to the first user disconnecting from the first call within the first predetermined time period: selecting a second user from the one or more users; and connecting the second user to the first call.

Clause 20: The method of clause 19, wherein determining, using the one or more signals, that the first user disconnected from the first call within the first predetermined time period further comprises: receiving a first signal of the one or more signals from a call provider that the first call has ended; and transmitting a second signal of the one or more signals to the call provider to continue the first call.

Clause 21: A system comprising: one or more processors; and a memory in communication with the one or more processors and storing instructions that, when executed by the one or more processors, are configured to cause the system to: receive a first call from a first incoming caller; receive an indication of redirection from the first incoming caller; receive first user data from one or more users for a first connection to the first call; select a first user from the one or more users based on the first user data; connect the first user to the first call; determine whether the first user disconnected from the first call within a first time period; responsive to determining that the first user disconnected from the first call after an expiration of the first time period, determine whether the indication of redirection allows one or more redirections; responsive to determining that the indication allows for the one or more redirections: receive response data from the first incoming caller indicating one or more interests; select a second user of the one or more users based on the one or more interests; and connect the second user to the first call.

Clause 22: The system of clause 21, wherein: the second user of the one or more users is selected using a first machine learning model; the memory stores further instructions that, when executed by the one or more processors, are further configured to cause the system to: train the first machine learning model based on the response data indicating one or more interests and call data; and select, using the trained first machine learning model, a third user of the one or more users based on the response data; and connect the third user to the first call.

Clause 23: The system of clause 22, wherein: the memory stores further instructions that, when executed by the one or more processors, are further configured to cause the system to: receive second user data from the one or more users for a second connection to the first call; and the first user data is associated with a first group and the second user data is associated with a second group, the first user is selected from the first group, and the second user is selected from the second group.

Clause 24: The system of clause 23, wherein: the first group is different from the second group, and the second group is selected based on the one or more interests.

Clause 25: The system of clause 24, wherein the memory stores further instructions that, when executed by the one or more processors, are further configured to cause the system to: store, during the first call, the call data comprising additional information associated with the one or more interests; and transmit to the second group, the call data comprising the additional information associated with the one or more interests.

Clause 26: The system of clause 25, wherein the memory stores further instructions that, when executed by the one or more processors, are further configured to cause the system to: responsive to determining that the first user disconnected from the first call after the expiration of the first time period: select a third user from the one or more users based on third user data; and connect the third user to the first call.

Clause 27: The system of clause 26, wherein: the third user is selected from the first group; and the memory stores further instructions that, when executed by the one or more processors, are further configured to cause the system to: transmit to the first group, the call data.

Clause 28: The system of clause 24, wherein: the first user data from the one or more users comprises one or more first bids, and the second user data from the one or more users comprises one or more second bids.

Clause 29: The system of clause 21, wherein: determining whether the first user disconnected from the first call within the first time period further comprises: receiving one or more notifications from a call provider that the first call has ended; and transmitting the one or more notifications to the call provider to continue the first call; and the memory stores further instructions that, when executed by the one or more processors, are further configured to cause the system to: determine, using a second machine learning model, the first time period from historical call data.

Clause 30: A method comprising: receiving a first call from a first caller; receiving an indication of redirection from the first incoming caller; receiving first user data from one or more users of a first group for a first connection to the first call; selecting a first user from the one or more users of the first group based on the user data; connecting the first user to the first call; determining whether the first user disconnected from the first call after an expiration of a first predetermined time period; determining whether the indication of redirection allows one or more redirections; responsive to determining that the indication allows for the one or more redirections: selecting a second user from the one or more users of a second group based on the user data; and connecting the second user to the first call.

Clause 31: The method of clause 30, comprising: receiving second user data from one or more users of a second group for a second connection to the first call, and wherein selecting a second user from the one or more users of the second group is based on the second user data.

Clause 32: The method of clause 31, further comprising: selecting the second group based on one or more interests of the first caller, and wherein the first group is different from the second group.

Clause 33: The method of clause 32, further comprising: storing, during the call, call data comprising additional information associated with the one or more interests; and transmitting to the second group, the call data comprising the additional information associated with the one or more interests.

Clause 34: The method of clause 33, further comprising: responsive to determining that the first user disconnected from the first call after the expiration of the predetermined time period: selecting a third user from the one or more users based on the user data; and connecting the third user to the first call.

Clause 35: The method of clause 34, wherein: the third user is selected from the first group, and the method further comprises: transmitting to the first group, the call data.

Clause 36: The method of clause 31, wherein: the first user data from the one or more users comprises one or more first bids, the second user data from the one or more users comprises one or more second bids, and determining whether the first user disconnected from the first call within the first predetermined time period further comprises: receiving one or more notifications from a call provider that the first call has ended; and transmitting the one or more notifications to the call provider to continue the first call.

Clause 37: The method of clause 30, further comprising: generating and displaying a first graphical user interface presenting one or more control options, the one or more control options comprising a manual selection option, a rule-based automatic control option, and a machine learning model automatic control option; receiving, via the first graphical user interface, a first selection from the first user of one of the one or more control options; determining that the first selection is associated with the one or more control options; responsive to determining that the first selection is associated with the one or more control options, updating the first graphical user interface to display the first selection; generating, via the selected control option, one or more redirection options based on the selected control options; presenting, to the caller, via the first call, the one or more redirection options; receiving, from the caller, a second selection of at least one of the one or more redirection options; and wherein: the second user is selected based at least in part on the one or more redirection options, and the one or more redirection options are updated in real-time.

Clause 38: A system comprising: one or more processors; and a memory in communication with the one or more processors and storing instructions that, when executed by the one or more processors, are configured to cause the system to: receive a first call from a first incoming caller; receive an indication of redirection from the first incoming caller; receive first user data from one or more users of a first group for a first connection to the first call; select a first user from the one or more users of the first group based on the first user data; connect the first user to the first call; determine whether the first user disconnected from the first call within a first predetermined time period; responsive to determining that the first user disconnected from the first call after an expiration of the predetermined time period, determine whether the indication of redirection allows for one or more redirections; responsive to determining that the indication allows for the one or more redirections: select a second user of the one or more users of a second group; and connect a second user to the first call.

Clause 39: The system of clause 38, wherein the memory stores further instructions that, when executed by the one or more processors, are further configured to cause the system to: receive response data from the first incoming caller indicating one or more interests, and wherein the second user is selected based on the one or more interests.

Clause 40: The system of clause 38, wherein the memory stores further instructions that, when executed by the one or more processors, are further configured to cause the system to: transmitting, to a third-party system, at least a first portion of the user data associated with the first user, and wherein the first user is connected to the first caller responsive to the third-party system accepting the first user based on the first portion of the user data.

The features and other aspects and principles of the disclosed embodiments may be implemented in various environments. Such environments and related applications may be specifically constructed for performing the various processes and operations of the disclosed embodiments or they may include a general-purpose computer or computing platform selectively activated or reconfigured by program code to provide the necessary functionality. Further, the processes disclosed herein may be implemented by a suitable combination of hardware, software, and/or firmware. For example, the disclosed embodiments may implement general purpose machines configured to execute software programs that perform processes consistent with the disclosed embodiments. Alternatively, the disclosed embodiments may implement a specialized apparatus or system configured to execute software programs that perform processes consistent with the disclosed embodiments. Furthermore, although some disclosed embodiments may be implemented by general purpose machines as computer processing instructions, all or a portion of the functionality of the disclosed embodiments may be implemented instead in dedicated electronics hardware.

The disclosed embodiments also relate to tangible and non-transitory computer readable media that include program instructions or program code that, when executed by one or more processors, perform one or more computer-implemented operations. The program instructions or program code may include specially designed and constructed instructions or code, and/or instructions and code well-known and available to those having ordinary skill in the computer software arts. For example, the disclosed embodiments may execute high level and/or low-level software instructions, such as machine code (e.g., such as that produced by a compiler) and/or high-level code that can be executed by a processor using an interpreter.

The technology disclosed herein typically involves a high-level design effort to construct a computational system that can appropriately process unpredictable data. Mathematical algorithms may be used as building blocks for a framework, however certain implementations of the system may autonomously learn their own operation parameters, achieving better results, higher accuracy, fewer errors, fewer crashes, and greater speed.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology described above with reference to user devices may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures, and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

It is to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Although embodiments are described herein with respect to systems or methods, it is contemplated that embodiments with identical or substantially similar features may alternatively be implemented as systems, methods and/or non-transitory computer-readable media.

As used herein, unless otherwise specified, the use of the ordinal adjectives "first," "second," "third," etc., to describe a common object, merely indicates that different instances of like objects are being referred to, and is not intended to imply that the objects so described must be in a given sequence, either temporally, spatially, in ranking, or in any other manner.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system comprising:
   one or more processors; and
   a memory in communication with the one or more processors and storing instructions that, when executed by the one or more processors, are configured to cause the system to:
   receive a first call from a first incoming caller;
   receive user data from one or more users for a first connection to the first call;
   select a first user from the one or more users based on the user data;

connect the first user to the first call;
determine whether the first user disconnected from the first call within a first predetermined time period;
responsive to determining the first user disconnected from the first call with the first incoming caller within the first predetermined time period:
select a second user from the one or more users based on the user data; and
connect the second user to the first call.

2. The system of claim 1, wherein the user data from the one or more users comprises one or more first bids.

3. The system of claim 2, wherein the memory stores further instructions that, when executed by the one or more processors, are further configured to cause the system to:
identify, from the first call, the one or more users; and
selecting the first user from the one or more users based on the user data further comprises:
selecting the first user based on the highest bid of the one or more first bids.

4. The system of claim 1, wherein selecting the first user from the one or more users based on the user data further comprises:
selecting the first user from the one or more users based on an order of a queue, selecting a first user based on rules-based decisioning, selecting the first user based on availability, or combinations thereof.

5. The system of claim 1, wherein the memory stores further instructions that, when executed by the one or more processors, are further configured to cause the system to:
receive updated user data from the one or more users for a second connection to the first call.

6. The system of claim 5, wherein the updated user data from the one or more users comprises one or more second bids.

7. The system of claim 1, wherein determining whether the first user disconnected from the first call within the first predetermined time period further comprises:
receiving one or more notifications from a call provider that the first call has ended; and
transmitting the one or more notifications to the call provider to continue the first call.

8. The system of claim 1, wherein connecting the first user to the first call comprises forming a connection between the first caller and an outbound leg to the first user.

9. The system of claim 1, wherein the memory stores further instructions that, when executed by the one or more processors, are further configured to cause the system to:
responsive to determining the first user did not disconnect from the first call within the first predetermined time period or determining the first user disconnected from the first call outside the first predetermined time period, allow the first call to end.

10. The system of claim 1, wherein the memory stores further instructions that, when executed by the one or more processors, are further configured to cause the system to:
determine whether the second user disconnected from the first call within a second predetermined time period;
responsive to determining the second user disconnected from the first call within the second predetermined time period:
select a third user from the one or more users based on user data; and
connect the third user to the first call.

11. The system of claim 1, wherein the memory stores further instructions that, when executed by the one or more processors, are further configured to cause the system to:
calculate statistics for each user, the statistics associated with the first call and comprising at least a ratio of outbound calls to inbound calls, the ratio being greater than one, and earnings per call outbound;
generate a first graphical user interface showing the statistics;
transmit the first graphical user interface to a first device of the first user and a second device of the second user;
receive, via the first graphical user interface, from the first device of the first user, an updated selection of a selectable option indicating a change of routing responsive to determining a future user has disconnected from a future call with a future caller within the first predetermined time period;
change the routing for future calls in real time based on the updated selection of the selectable option; and
generate an updated graphical user interface showing the updated selection of the selectable option.

12. A method comprising:
receiving, from a third-party system, caller data associated with a first caller, the caller data comprising a contact method;
receiving user data from one or more users for a first connection to the first caller via the contact method;
selecting a first user from the one or more users based on the user data;
transmitting, to the third-party system, at least a first portion of the user data associated with the first user;
responsive to the third-party system accepting the first user based on the first portion of the user data, connecting the first user to the first caller using the first connection;
determining whether the first user terminated the first connection with the first caller within a first predetermined time period;
responsive to determining the first user terminated the first connection with the first caller within the first predetermined time period:
selecting a second user of the one or more users based on the user data;
transmitting, to the third-party system, at least a second portion of the user data associated with the second user; and
responsive to the third-party system accepting the second user based on the second portion of the user data, connecting the second user to the first caller using a second connection.

13. The method of claim 12, wherein selecting the first user based on the user data further comprises:
selecting the first user from the one or more users using an order of a queue, selecting the first user based on rules-based decisioning, selecting the first user based on availability.

14. The method of claim 12, wherein:
connecting the first user to the first caller comprises forming a connection between the first caller and an outbound leg to the first user, and
determining whether the first user terminated the first connection with the first caller within the first predetermined time period further comprises:
monitoring the first connection for one or more first signals from a call provider indicating the first user has hung up; and
transmitting one or more second signals to the call provider to continue the first connection after the first user has hung up.

15. The method of claim 12, further comprising:
responsive to determining the first user did not terminate the first connection with the first caller within the first predetermined time period or determining the first user terminated the first connection with the first caller outside the first predetermined time period, allow the first connection to end.

16. The method of claim 12, wherein the user data further comprises one or more first bids, and the method further comprises:
receiving updated user data comprising one or more second bids, and
wherein:
the one or more first bids are made in a first round of bidding, and
the one or more second bids are made in a second round of bidding.

17. The method of claim 16, wherein:
the first round of bidding is associated with first data regarding the first connection, and
the second round of bidding is associated with second data regarding the second connection, the method further comprising:
transmitting, to the one or more users, the first data and the second data, and
wherein the second data includes information from the first connection.

18. The method of claim 12, further comprising:
determining whether the second user terminated the second connection with the first caller within a second predetermined time period;
responsive to determining the second user terminated the second connection with the first caller within the second predetermined time period:
selecting a third user of the one or more users based on the user data; and
connecting the third user to the first caller.

19. A method comprising:
receiving a first call from a first caller;
receiving user data from one or more users for a first connection to the first call;
selecting a first user from the one or more users based on the user data;
connecting the first user to the first call;
determining, using one or more signals, that the first user disconnected from the first call within a first predetermined time period;
responsive to the first user disconnecting from the first call within the first predetermined time period:
selecting a second user from the one or more users; and
connecting the second user to the first call.

20. The method of claim 19, wherein determining, using the one or more signals, that the first user disconnected from the first call within the first predetermined time period further comprises:
receiving a first signal of the one or more signals from a call provider that the first call has ended; and
transmitting a second signal of the one or more signals to the call provider to continue the first call.

\* \* \* \* \*